United States Patent [19]
Cline et al.

[11] Patent Number: 4,642,775
[45] Date of Patent: Feb. 10, 1987

[54] AIRBORNE FLIGHT PLANNING AND INFORMATION SYSTEM

[75] Inventors: J. Douglas Cline, Mission Viejo, Calif.; James A. Wilson, Prescott, Ariz.; Stanley H. Feher, Corona, Calif.; George D. Ward, Prescott, Ariz.

[73] Assignee: Sundstrand Data Control, Inc., Redmond, Wash.

[21] Appl. No.: 737,665

[22] Filed: May 24, 1985

Related U.S. Application Data

[63] Continuation-in-part of Ser. No. 613,987, May 25, 1984, abandoned.

[51] Int. Cl.⁴ .............................................. G06F 15/50
[52] U.S. Cl. ................................. 364/443; 364/420; 364/444
[58] Field of Search ............ 364/443, 444, 439, 436, 364/460, 420; 73/178; 179/6.01; 343/5 W; 340/947

[56] References Cited

U.S. PATENT DOCUMENTS

| | | | |
|---|---|---|---|
| 3,781,530 | 12/1973 | Britland et al. | 343/5 W X |
| 3,786,505 | 1/1974 | Rennie | 343/7 ED |
| 3,805,261 | 4/1974 | Deschamps et al. | 343/5 MM |
| 4,086,632 | 4/1978 | Lions | 364/444 |
| 4,103,300 | 7/1979 | Gendreu et al. | 343/6 R |
| 4,144,571 | 3/1979 | Webber | 364/450 |
| 4,179,693 | 12/1979 | Evans et al. | 343/5 MM |
| 4,212,067 | 7/1980 | Henderson | 364/450 |
| 4,220,994 | 9/1980 | Hendrickson | 364/450 |
| 4,224,669 | 9/1980 | Brame | 364/433 |
| 4,253,150 | 2/1981 | Scovill | 364/449 |
| 4,312,041 | 1/1982 | DeJonge | 364/442 |
| 4,340,936 | 7/1982 | Mounce | 364/443 |
| 4,360,876 | 11/1982 | Girault et al. | 364/449 |
| 4,413,322 | 1/1983 | Foster et al. | 364/448 |
| 4,428,052 | 1/1984 | Robinson et al. | 364/436 |
| 4,454,510 | 6/1984 | Crow | 343/5 GC |
| 4,495,580 | 1/1985 | Keearns | 364/450 |
| 4,521,857 | 6/1985 | Reynolds, III | 364/439 |

OTHER PUBLICATIONS

Informational Brochure, "Airborne Flight Information System: Specifications" by Global Navigation Systems.
"Airborne Flight Information System: Optimum Performance Planning for All Phases of Flight" by Global Systems.
Informational Brochure distributed by National Weather Corporation—no date.
Informational Brochure, "Electronic Flight Service," distributed by CompuServe, Inc.
Informational Brochure, "FLITEbrief," distributed by Compuflight Operations Service, Inc., WSI Corp., & Universal Weather and Aviation, Inc.
Article by James Ott, "Delta Anticipates Savings in Flight Planning System," *Aviation Week & Space Technology*, Apr. 30, 1984, pp. 34 & 39.
Article by Alton K. Marsh, "Pilots Evaluating Personal Computer," *Aviation Week & Space Technology*, Oct. 17, 1983, pp. 92, 93, 95.
Article by Cecilia Preble, "Global's Data Link to Aid In-Flight Planning," *Aviation Week & Space Technology*, Oct. 1, 1984, pp. 115, 117.
Article by Kenneth J. Stein, "Exhibitors Show Corporate Flight Plan Concepts," *Aviation Week & Space Technology*, Oct. 22, 1984, p. 133.

*Primary Examiner*—Parshotam S. Lall
*Assistant Examiner*—Thomas G. Black
*Attorney, Agent, or Firm*—Christensen, O'Connor, Johnson & Kindness

[57] ABSTRACT

A flight planning system for obtaining flight plans and/or weather information is provided with a portable computer having a display unit, keyboard, memory, built in modem and a built in disk drive that can be connected via telephone lines to a ground based data center. The basic flight planning data and/or weather request data is input in response to menu driven prompts and reviewed on the display by the pilot. The portable computer is then connected to the data center which generates a series of optimized flight plans and provides desired weather information. After the desired flight plan and/or weather information has been selected by the pilot, it is loaded onto a floppy disk in the disk drive. The aircraft is provided with a data transfer unit which accepts the floppy disk and downloads the flight plan and requested weather information into the onboard computerized navigation system. In addition the aircraft is provided with a VHF radio system for inflight communication with the data center so that the flight plan and/or weather information can be updated.

40 Claims, 17 Drawing Figures

AIRBORNE FLIGHT PLANNING AND INFORMATION SYSTEM

CROSS-REFERENCE TO RELATED APPLICATIONS

This patent application is a continuation-in-part of U.S. patent application Ser. No. 613,987, filed May 25, 1984 now abandoned.

TECHNICAL FIELD

The invention relates to the field of flight planning systems and in particular to flight planning systems utilizing a portable computer and airborne radio communication facilities.

BACKGROUND OF THE INVENTION

In order to simplify and optimize the flight planning process for pilots a number of computerized flight planning services have been developed such as the Lockheed Corporation's Jet Plan service. By utilizing a terminal connected to a centralized database a pilot can generate a flight plan for a particular destination. The computer database will include routing information such that the optimum route between a destination and a departure airport can be automatically generated, weather information including terminal weather, winds aloft, area forecasts and SIGMETS as well as performance data for various types of aircraft such that the flight plan can be otpimized automatically to take into account the characteristics of the aircraft.

However, the existing computerized flight planning services have a number of limitations including the fact that it is necessary for the pilot, after the flight plan has been generated on his terminal, to take the printed copy of the flight plan and enter it manually into the aircraft navigation or flight management computer. This process in the past has been limited to route and waypoint entry only, not including leg-by-leg fuel, time and cruise mode parameters. Further, the manual process is tedious and can also result in erroneous inputs to the navigation system. The existing flight planning systems also suffer from the disadvantage that they are unable to provide for changes in flight plans once the aircraft is airborne. It is not uncommon for flight conditions such as weather to change or for the air traffic control situation to limit the availability of flight levels. Existing systems do not provide a convenient method for requesting and receiving an updated optimized flight plan from the aircraft in flight.

Another limitation of the currently available flight plan systems is that there is no convenient way to monitor the progress of the aircraft against the flight plan. For example, for any position between the specified waypoints on the flight plan, it is necessary for a pilot to either mentally interpolate flight plan data such as fuel usage or to use a pencil and paper or calculator to generate the data that he can compare to the aircraft's actual progress. Similarly there is no convenient way for the pilot utilizing existing systems to get appropriate weather updates that can be integrated into the flight plan while the aircraft is in flight.

SUMMARY OF THE INVENTION

It is therefore an object of the invention to provide a computerized flight planning system utilizing a portable computer including a modem that can be connected to a flight data center via telephone lines to obtain pertinent weather information and/or generate a flight plan. Weather and flight plan information is transmitted from the data center to the portable computer for storage on a floppy disk or other medium which is then inserted into a data transfer unit located in the aircraft cockpit. The data transfer unit reads the stored flight plan and weather information and transfers the information to a data management unit, which generally is located in the electronics bay of the aircraft. During operation of the flight planning system onboard the aircraft, a signal processing unit that is located within the data management unit formats weather and flight plan data for display on a control and display unit that is located in the aircraft cockpit. In the currently preferred embodiments of the invention, the flight planning system utilizes the aircraft navigation or flight management system control and display unit and the data management unit is interconnected with the aircraft flight management or navigation computer to thereby permit the automatic entry of the flight plan into the flight management or navigation system.

It is an additional object of the invention to provide an airborne flight planning system that utilizes data transmission facilities from the aircraft to ground to permit the flight crew to obtain updated weather information or generate either a different flight plan or the update of an existing flight plan.

In the currently preferred embodiments of the invention, the data management unit includes a VHF data transmitter-receiver. To obtain updated weather information and/or update an existing flight plan or obtain a new flight plan, the flight crew enters the necessary information on the control and display unit in response to data requests or "prompts" that are formatted by the data management unit and displayed on the control and display unit. The information entered by the flight crew is then transmitted by the VHF transmitter-receiver to a VHF transmitting and receiving facility that is located on the ground and is connected by landlines to a flight data center. The flight data center formulates the requested weather or flight plan information based on a database that is maintained by the flight data center. That database includes aircraft route data, performance data for various types of aircraft and, both observed and forecasted weather data. The weather and/or flight plan requested by the aircraft is then transmitted to the ground based VHF transmitting and receiving facility which relays the information to the data management unit VHF transmitter-receiver. In the event that the weather and/or flight plan requested by the flight crew cannot be provided, the flight data center transmits an appropriate message to the aircraft. The information received by the data management unit VHF data transmitter-receiver is processed by the signal processing unit that is located in the data management unit and is made available to the flight crew through operation of the control display unit.

In the currently preferred embodiments of the invention, the data management unit and the aircraft navigation or flight management computer are operably interconnected to permit the flight crew to monitor aircraft progress relative to the flight plan by comparing the actual value of various important flight information with "planned" values that are based on the current position of the aircraft and the flight plan being followed. More specifically, in accordance with the invention, the signal processing unit that is located in the data management unit receives important flight information such as aircraft speed, wind conditions, distance remaining to the terminus of the flight plan leg being navigated, fuel flow and fuel remaining. Based on the information received from the aircraft navigation or flight management computer and data that represents the flight plan being navigated, the data management unit determines the current planned value for each selected item of important flight information. The planned and actual values are then displayed on the control and display unit in a manner that permits comparison of the actual and planned values. This allows the aircraft flight crew to continuously monitor aircraft progress and, if necessary or desirable, update or change the flight plan.

DETAILED DESCRIPTION OF THE INVENTION

Figure 1:
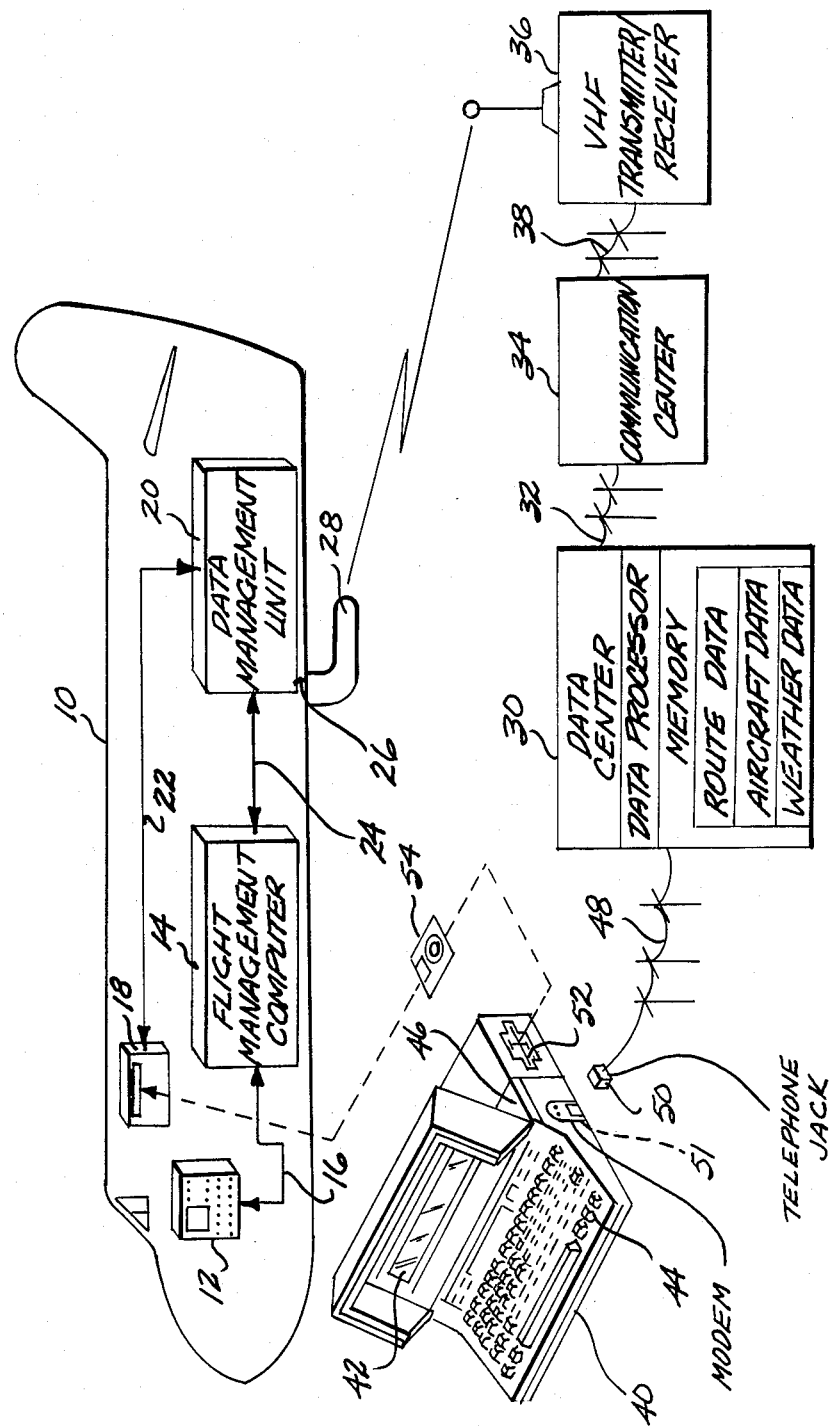
FIG. 1 is a block diagram of the overall flight planning system including components located on an aircraft, a portable computer, a ground based data center and data transmission facilities.

In FIG. 1 is illustrated an overall block diagram of a flight planning and information system that is configured in accordance with this invention and, in the depicted arrangement is specifically configured to operate in conjunction with the aircraft navigation (or flight management) system. A portion of the equipment required for the flight planning system is installed aboard an aircraft 10. Included in this equipment is a navigation system control and display unit (CDU) 12 which is installed in the cockpit so as to be accessible to the flight crew. Associated with the navigation system CDU 12 is a navigation or flight management computer 14 which is typically located in the electronics bay of the aircraft 10 or some other position remote from the cockpit and is connected to the CDU 12 by means of a bidirectional data bus 16. In more recently available navigation systems for aircraft the navigation CDU 12 and a flight management computer 14 are interconnected to provide a comprehensive navigation system that uses, for example, VLF/OMEGA, inertial reference and DME/VOR inputs for navigation. The flight management computer 14 of such a system typically includes a DME/VOR processor which processes signals from the DME and VOR radio receivers. A suitable navigation system for use with the invention is commercially available as the GNS 1000 flight management system by Global Systems, Inc. of Irvin, Calif. which includes a CDU 12 and a flight management computer 14.

Upon understanding the arrangement of FIG. 1, the invention can be practiced in conjunction with various other flight management and navigation systems and, if desired, can be embodied to operate independent of an aircraft navigation system.

Also installed in the aircraft 10 of FIG. 1 is a data transfer unit 18 which is preferably located in the cockpit of the aircraft 10. As will be described in connection with FIG. 2, the data transfer unit 18 includes a floppy disk drive along with associated electronics.

The fourth piece of equipment located in the aircraft is a data manangement unit 20 which, as with the flight management computer 14, typically is located in the electronics bay of the aircraft 10. As will be described in connection with FIG. 3, the data management unit 20 includes a microprocessor, memory, a modem and a VHF transceiver (not shown in FIG. 1). In FIG. 1, the data management unit 20 is connected to the data transfer unit 18 by means of a bidirectional data bus 22 and to the flight management computer 14 by means of a bidirectional data bus 24. In order to provide for communications with the ground, the data management unit 20 is connected by means of a line 26 to an antenna 28 that is secured to the hull of the aircraft.

Located on the ground is a data center 30 that includes computers having stored therein route and navigation information, weather information and the performance characteristics of aircraft. As will be described in detail, the data center 30 in response to certain pilot inputs will generate flight plans. Connected to the data center 30 by means of telepone lines indicated at 32 is a communication center 34 which provides a VHF radio system for communicating with the aircraft 10. One suitable VHF radio system is the system known as ACARS, which is a service of ARINC (Aeronautical Radio, Inc.), that utilizes one or more communication centers 34 that are linked to a series of VHF transmitting and receiving facilities located about the United State to communicate with airborne aircraft. One such transmitting and receiving facility is at 36 connected to the ACARS communication center 34 by means of telephone lines 38.

A significant feature of the invention is the use of a portable computer shown at 40 of FIG. 1. A suitable portable computer is manufactured by the Gavilan Computer Corporation. In the preferred embodiment of the invention the computer 40 includes a liquid crystal display 42 that provides, for example, display of 16 lines of 80 characters. Also included in the computer 40 is a keyboard 44 for entering data into the computer 40. So as to make the flight planning system as flexible as possible, the computer 40 is battery operated and includes battery storage indicated at 46. In order to be able to communicate with the data center 30 over telephone lines 48, the computer 40 includes a built in modem 51 which can be connected by means of a standard telephone jack 50 to the telephone lines 48.

One of the most significant features of the invention is the provision for the automatic loading of a flight plan or weather into the data management unit 20 and/or flight management computer 14 of the aircraft 10. The automatic loading includes all waypoints constituting the planned route and all salient flight plan data for each leg of the flight plan, including predicted fuel flows, estimated time enroute, predicted fuel consumption, distance to be traveled and forecasted weather. In order to provide that capability, the computer 40 includes a disk drive 52 in which a magnetic disk (e.g., a floppy disk) 54 may be inserted. The flight plan after it has been generated by the data center and transmitted over line 48 to the computer 40 is loaded on the disk 54 which is resident in disk drive 52. Then as indicated by the dash line 56 of FIG. 1 the floppy disk 54 can be extracted from the disk drive 52 and physically carried by the pilot to the aircraft and inserted in the data transfer unit 18. The data transfer unit 18 will then download the flight plan through data bus 22 to the data management unit 20 which then makes the flight plan available to the flight management computer 14. It is this particular feature that eliminates the necessity for the manual entering of a flight plan into an onboard navigation computer system.

Figure 2:
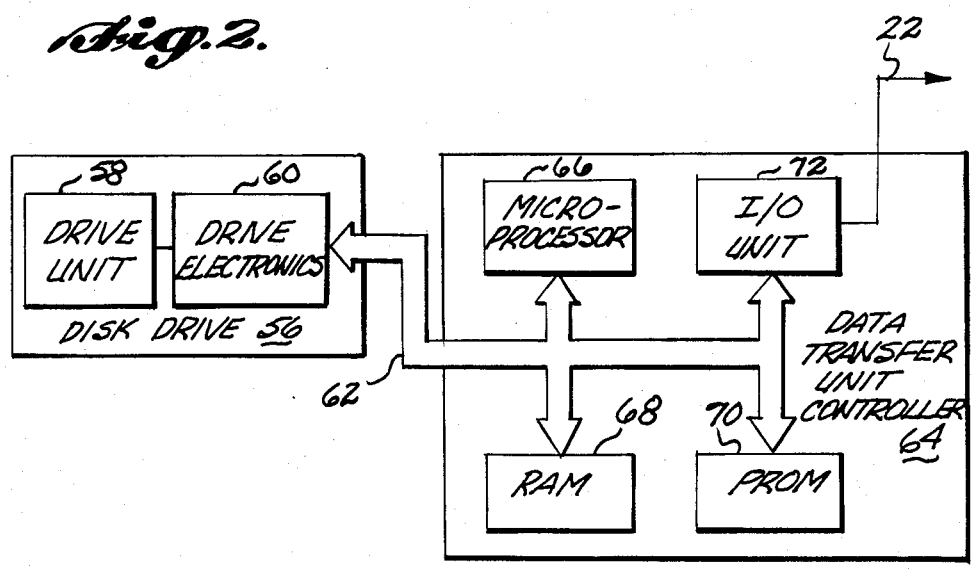
FIG. 2 is a block diagram of a data transfer unit for use in the aircraft of FIG. 1.

In FIG. 2 illustrated in block diagram form is the data transfer unit 18. The data transfer unit 18 includes a disk drive (e.g., a 3.5 inch micro floppy disk drive) 56 which in turn includes a mechanical drive unit 58 and the drive electronics 60. Connected to the drive electronics 60 by means of a data bus 62 is a data transfer unit controller 64 that includes a microprocessor 66, random access memory (RAM) 68, programmable read only memory (PROM) 70 and an I/O unit 72. As shown in FIG. 2 the I/O unit is connected to the data bus 22 and therefore is connected for communication with the data management unit 20. In operation the data transfer unit controller 64 responds to a request transmitted over data bus 22 by the data management unit 20 to download the flight plan data from a disk 54 that is inserted in the disk drive 58. During this downloading sequence, microprocessor 66 executes program instructions that are stored in PROM 70 to access the request via I/O unit 72 and activate disk drive 56 by coupling a suitable serially-encoded digital signal to data bus 62. Under control of microprocessor 66, data read from the disk 54 are coupled to RAM 68 vid data bus 62 and are transmitted to the data management unit 20 via data bus 62, I/O unit 72 and bidirectional data bus 22.

Figure 3:
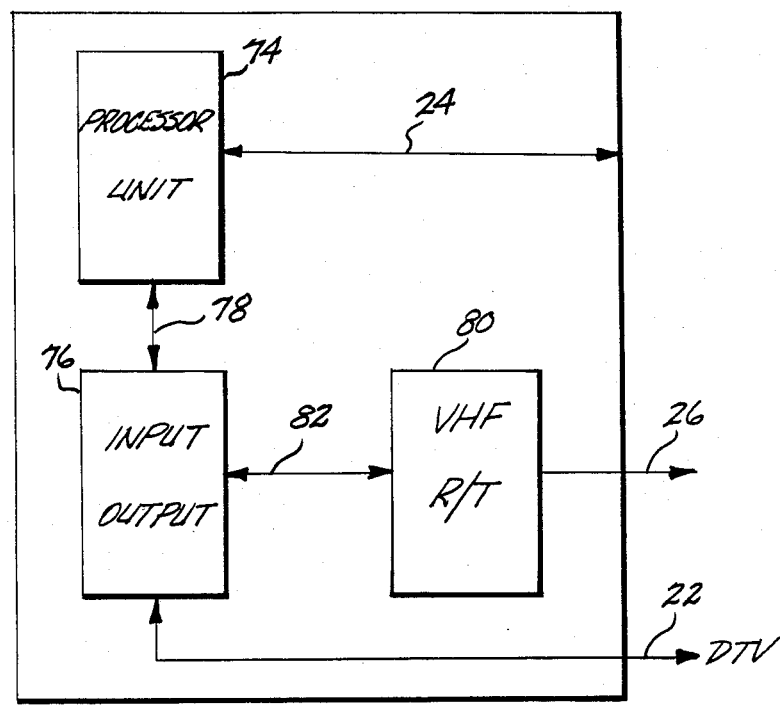
FIG. 3 is a block diagram of a data management unit for use in the aircraft of FIG. 1.

FIG. 3 shows in block diagram form the structure of the data management unit 20. Included in the data management unit 20 is a processor unit 74 that performs the various signal processing operations described herein. In the currently preferred embodiments of the invention, the processor unit 74 is a conventionally structured microprocessor based circuit arrangement that includes a microprocessor, random access memory, read only memory and an input-output device. Also included in data management unit 20 of FIG. 3 is an input-output circuit 76 that is connected to the processor board 74 by means of data transfer line 78. The input-output circuit 76 includes a modulator-demodulator circuit (modem) which is utilized with a VHF receiver-transmitter, which also is mounted within the data management unit 20. In the arrangement shown in FIG. 3, the input-output circuit 76 is connected to the data transfer unit 18 of FIG. 1 by means of bidirectional data bus 22 and to the VHF receiver-transmitter 80 by means of a line 82. The VHF receiver-transmitter 80 is connected to the antenna 28 shown in FIG. 1 by means of line 26. In operation the data management unit 20 receives the flight plan data from the data transfer unit 18 and stores the flight plan in the random access memory of the processor unit 74. As shall be described in more detail hereinafter, the stored flight plan data can be transferred to the flight management computer 14 and is formatted for display and use by CDU 12 during navigation of a flight plan. Flight plan data can also be received while airborne from the ground-based data center 30 through the VHF receiver transmitter 80 where it is demodulated within input-output circuit 76 and transferred by means of line 78 to random access memory of the processor board 74. Thus the data management unit 20 is able to receive flight planning information or flight plans from either the disk 54 or, when the aircraft is in the air, the VHF transmitter-receiver 36.

Operation of the flight planning system to store one or more flight plans on the disk 54 begins with the activation of the portable computer 40 by the pilot. This can be done in a location remote from the aircraft 10, including a flight planning center or even the pilot's hotel room if necessary. When the computer 40 has been initialized a series of menu driven questions are presented on the display 42. In the preferred embodiments of the invention this occurs before the computer 40 is connected to the flight data center 30. The pilot can input, via the keyboard 44, certain information relating to a flight plan into the computer 40 including:

(1) Aircraft Registration Number
(2) Type of Aircraft
(3) Basic Operating Weight
(4) Taxi Fuel Weight
(5) Reserve Fuel Weight
(6) Preferred Mach/TAS
(7) Direct Operating Cost
(8) Fuel Price Per Gallon
(9) Maximum Allowable Fuel
(10) Departure Airport

(11) Departure Time
(12) Destination Airport
(13) Route Preference (Navaids and jet routes, jet routes only, pilot selected routes or FAA preferred routes)
(14) Payload Weight
(159 Fuel on Board
(16) Performance Bias
(17) Weather Requests
(18) Message Entry In the preferred embodiment of the invention the first nine items of the above-listed items of information need not be supplied each time a flight plan is to be established. In particular, after a disk 54 has been initially used for storing a flight plan, the values of these information items will appear on the display 42 for pilot review and verification each time and flight planning process is initiated. As a result, unless there are changes, it is not necessary for the pilot to enter these values.

After the above information has been entered into the computer 40, the pilot accesses the data center 30 by means of telephone lines 48. The flight planning data as listed above is then transmitted to the data center 30 for validation and reasonableness checking. In the preferred embodiment of the invention, invalid or unreasonable entries will be transmitted back to the computer 40 for correction by the pilot. After the pilot entries have been validated the data center 30 transmits any weather information requested by the pilot for display on the display unit 42. After reviewing the weather information, the pilot may amend one or more of his flight plan inputs above and request a new flight plan or he can request the flight plan immediately without amending any of the inputs.

In the currently preferred embodiments of the invention, after the pilot inputs have been received the data center 30 computes three flight plans based on three different cruise mode: high speed cruise (for that particular aircraft), preferred Mach/TAS (entered by the pilot) and long range cruise (for that particular aircraft). Flight plan summary information including total time, fuel and cost for each of the three cruise modes are generated and displayed on the display unit 42. Based on the displayed information, the pilot then selects the most desirable cruise mode and the flight data center 30 responds by computing separate flight plan options for that cruise mode for three different flight levels. At this point the pilot may review each of the three flight level options (flight plan summary data) which are displayed on the display unit 42. The desired flight plan is then selected by the pilot and the completed flight plan is transmitted via telephone line 48 to the computer 40 and loaded by means of the disk drive 52 into the disk 54. After the complete flight plan has been transmitted, the pilot can terminate the telephone connection and use the information stored on disk 54 to review the flight plan and weather data at his convenience.

In addition to the flight plan itself the data center 30 can transmit to the computer 40 weather data as requested. The weather data for example might include terminal weather which can be accessed by an airport identifier and includes the three most recent sequence reports, terminal forecasts, conventional Notices to Airmen (NOTAMS) and pilot reports (PIREPS). In addition, area forecasts may be accessed by designated areas, SIGMETS and winds aloft may also be accessed by the computer 40.

Once the computer 40 has been disconnected from the data center 30, the pilot can review on the display 42 various factors relating to the generated flight plan. The data available for review includes: the pilot inputs, route description, flight levels, aircraft weights, fuel parameters. A leg by leg display of the flight plan is also provided that includes for each leg: flight level, distance, estimated time enroute (ETE), magnetic course, predicted fuel burn, predicted fuel flow, predicted ground speed, predicted true airspeed (TAS), forecasted wind, forecasted outside air temperature, predicted remaining fuel, predicted remaining flight distance and predicted remaining flight time.

Once the pilot has finished reviewing the flight plan data and weather that is displayed on the display unit 42, the disk 54 is ejected from the disk drive 52 and transferred to the data transfer unit 18 in the cockpit by the pilot. The portable computer 40 can then be stored in any convenient location such as the aircraft baggage compartment.

During preflight operations the pilot inserts the disk 54 into the data transfer unit 18. Typically the navigation system CDU 12 will be initialized which allows the data management unit 20 to load the directory of flight plans from the data transfer unit 18 into the data management unit 20 and into a directory of flight plans that is stored in the flight management computer 14. The pilot then can select an appropriate flight plan from the directory of the flight management unit 20 and, if desired, adopt the selected flight plan as the active flight plan of the aircraft navigation system.

Once the flight plan and weather data is resident in the data management unit 20 and accessible by the flight management computer 14, any stored flight plan can be accessed and reviewed on the CDU 12 of the navigation system. This information can include the same weather data that was available for review on the portable computer 40.

An important feature of the system illustrated in FIG. 1 of the drawings is the provision for a flight plan progress display which may be provided on the CDU 12. Here a side-by-side comparison of the planned versus actual flight parameters can be viewed by the pilot at any time during the flight. These parameters include: fuel remaining, fuel flow per engine, estimated time of arrival, ground speed, true air speed, wind direction and velocity. Only the actual parameters are displayed if a leg change from the flight plan is in effect which does not correspond to a flight plan leg that has been generated by the data center 30.

Additional features of the flight planning system illustrated in FIG. 1 include the accessibility via VHF radio of certain information when the aircraft is in flight. This information includes updates to the existing data center 30 generated flight plan such as route changes, flight level changes and fuel status changes. Also updates to the existing onboard weather database can be provided, including terminal weather updates, SIGMET updates and winds aloft updates. This information can be requested through the CDU 12 of the navigation system wherein the request and data are transmitted through the VHF transmitter 36 to the data management unit 20 so that the appropriate data from the data center 30 can be transmitted to the aircraft 10.

The system as described above provides a number of important features such as the utilization of a programmed portable computer that minimizes on-line communications time with the data center 30 and, thus minimizes operating costs while providing easily utilized menu driven inquiries and data entry for producing the flight plan and accessing weather information. Flight plans that provide full optimization of the climb, cruise and descent phases of flight through integration of aircraft performance, wind and navigation data are provided by the flight planning system utilizing the data in the data center 30. As described previously, custom flight plan selection based on a menu offering of 9 possible flight plan variations is provided by the currently preferred embodiments of the system. Another important feature of the system is allowing complete integration of all necessary flight plan and weather data into the onboard flight management computer 14 by the automatic loading of flight plans via the data transfer unit 18. Progress monitoring of the actual aircraft performance in comparison to the flight plan is an additional feature of the system.

Perhaps one of the most important features of the system is the real time access to the data center 30 via the ACARS communication system that provides for inflight updates to weather as well as permitting flight plan revision or the creation of entirely new flight plans while the aircraft is airborne.

Figure 4:
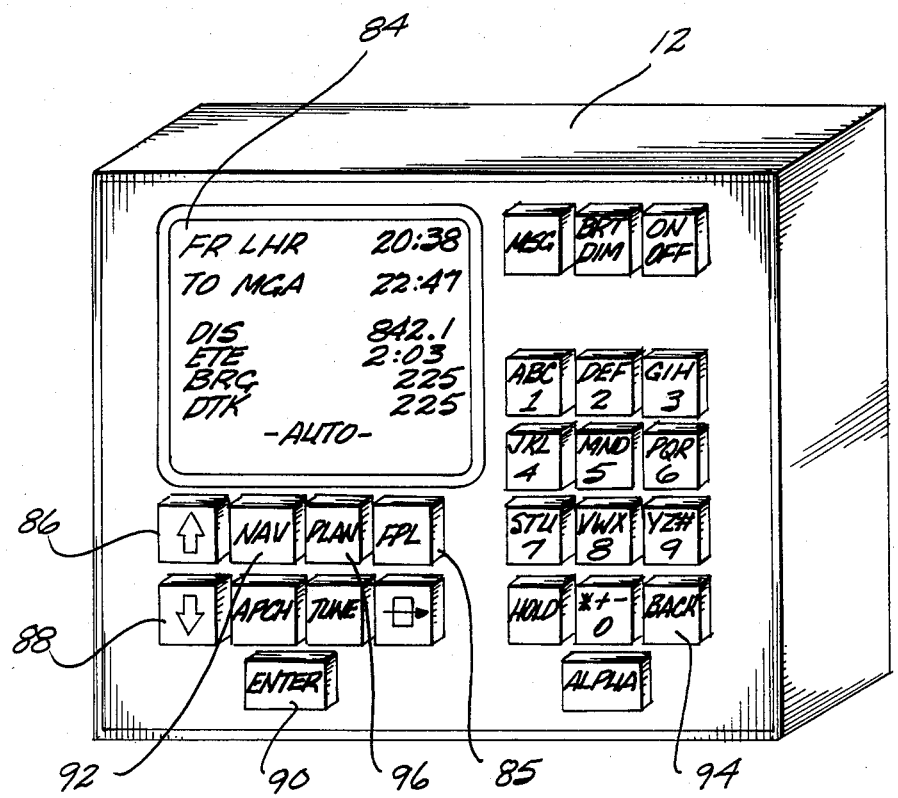
FIG. 4 illustrates a control and display unit for use in controlling the operation of the data transfer and data management units and for displaying flight plan information.

One of the major advantages of the preferred embodiment of the invention is utilization of the control and display unit 12 in combination with the radio communications capability of the data management unit 20 to communicate with the ACARS communications center 34 and hence the data center 30 to provide timely information with, for example, respect to weather and to generate updated flight plans. FIG. 4 illustrates in detail the control and display unit 12 of the aircraft navigation system. In order to illustrate the airborne capabilities of the flight planning system, the nature of the displays on the control and display unit 12 will be discussed below. When the aircraft is in flight the master menu, as shown below, can be displayed on the control and display unit 12 CRT 84 by the pilot in response to a pilot selection from the keyboard.

```
[  WX AND PERFORMANCE          ]
[                               ]
[  ENTER DESIRED #              ]
[                               ]
[  1 FLIGHT PLAN                ]
[  2 FPL PROGRESS               ]
[  3 ENROUTE WX                 ]
[  4 TERMINAL WX                ]
[  5 WINDS ALOFT                ]
[  6 UPDATE                     ]
```

As indicated above the master menu for weather and flight plan data includes 6 options for data that may be displayed on the CRT 84.

The first option is a display of the flight plan as indicated by the display screen below.

```
         [  FLIGHT PLAN #101                    ]
         [  ISSUE 04MAR83 N575CC                ]
         [                                      ]
         [  KSNA-KDEN                           ]
Page 1   [                                      ]
         [  AIRCRAFT TYPE       CE500           ]
         [  PERF OPTION         LRC             ]
         [  RAMP WEIGHT         11408           ]
         [  LDG WEIGHT          8945            ]
         [  FLIGHT LEVEL        330             ]
         [  FLIGHT PLAN #101                    ]
```

```
         [  -continued                                 ]
         [  FR KSNA         FUEL         TIME          ]
         [                                              ]
         [  TO KDEN         2313         2+23          ]
Page 2   [  HOLDING         —            —             ]
         [  TO KAPA         235          0+10          ]
         [  RESERVE         800          0+59          ]
         [                                              ]
         [  TOTALS          3348         3+32          ]

[  FLIGHT PLAN #101                           ]
         [                                              ]
         [  ROUTE                                       ]
         [                                              ]
Page 3   [  KSNA-MUSEL4-TRM-J78-                        ]
         [  PRC-TBC-J128-DEN-                           ]
         [  KDEN                                        ]

[  WAYPOINT LOCATIONS                          ]
         [                                              ]
         [  KSNA      N33405       W117520              ]
         [  TRM       N33377       W116096              ]
         [  PRC       N34422       W111161              ]
Page 4   [  TRM       N36073       W111161              ]
         [  DEN       N39480       W104526              ]
```

As shown above the first page of the flight plan displays the flight plan number, the data the flight plan was established and the pilot inputs that were used to generate the flight plan. The second page displays the predicted fuel consumption and flight time for each of the legs of the flight plan and the third page displays the route of the flight plan utilizing conventional waypoint and navigation aid identifiers. The fourth flight plan page displays the waypoint longitude and latitude for each of the navigation points in latitude and longitude.

As indicated previously, one of the major features of the invention is the provision for inflight monitoring of the flight plan progress (option "2 FPL PROGRESS" of the master menu displayed by CRT 84 of the CDU 12). An example of a typical CDU 12 display of this feature is provided below.

```
[  PRC-TBC                                      ]
[  PLAN ACTUAL                                  ]
[  FL           330         330                 ]
[  GS           364         375                 ]
[  ETE          0+19        0+17                ]
[  TAS          339         341                 ]
[  WIND         28030       27041               ]
[  FUEL FL      934         950                 ]
[  FUEL RM      2300        2275                ]
[  TIME RM      1+26        1+23                ]
```

As shown above, a comparison of the aircraft's actual performance in terms of speed, winds, fuel usage and time can be continuously compared to the predicted values from the flight plan.

Another feature of the invention is the provision for the display of enroute weather (option "3 ENROUTE WX" of the master menu displayed by CRT 84 of the CDU 12). When the enroute weather option has been selected from main menu, the first screen to be displayed on CDU 12 will be the one shown below where the pilot is able to select from a menu the identifier representing the cities of San Francisco, Calif. (SFO), Salt Lake City, Utah (SLC), Dallas-Forth Worth, Tex. (DFW), and Miami, Fla. (MIA).

```
    ENROUTE WX

ENTER DESIRED #

1 SFO          7___
   2 SLC          8___
   3 DFW          9___
   4 MIA         10___
   5___          11___
   6___          12___
```

As an example of this feature, assume that the enroute weather for MIA (Miami) is selected by entering "4" adjacent the legend "ENTER DESIRED #" on the screen above. The CRT 84 of CDU 12 will generate a display screen which displays the currently valid SIGMETS for MIA. Such a display could be as follows.

```
          MIA SIGMETS

ALPHA 2: SEVERE
   CLEAR AIR TURBULENCE
   EXTENDING FROM SOUTH
   CENTRAL VIRGINIA
   THROUGH DELAWARE AT
   14000 TO 24000 MSL

HURRICANE IONA: AT
```

The next weather screen will display turbulence in the general geographic areas as exemplified by the screen below.

```
          MIA TURBULENCE

MODERATE BELOW 6000-
   12000 FT OVER
   WESTERN NORTH
   CAROLINA WESTERN
   SOUTH CAROLINA
   NORTHERN GEORGIA
   WITH OCCASIONAL
   SEVERE TURBULENCE
```

By the same token the icing conditions for this geographical area can be shown by the screen below.

```
          MIA ICING

LIGHT TO MODERATE
   RIME ICING IN CLOUDS
   WITH CHANCE OF
   MODERATE MIXED ICING
   IN PRECIPITATION
   WESTERN NORTH
   CAROLINA UNTIL 1200
   EST. FREEZING LEVEL
```

Weather for a particular airport (terminal) can be displayed by selecting option "4 TERMINAL WX" of the master menu displayed by CRT 84 of the CDU 12. When this option is selected CDU 12 responds with a display such as the screen shown below to allow selection of the airport terminal for which weather information is desired.

```
          TERMINAL WX

ENTER DESIRED #
```

```
          -continued
   1 KSNA          7___
   2 KLGB          8___
   3 KLAS          9___
   4 KGJT         10___
   5 KDEN         11___
   6 KAPA         12___
```

An example of a terminal weather forecast for KSNA, which is obtained by keying in "4" adjacent the legend "ENTER DESIRED #," is shown below.

```
       KSNA SA     04MAR83

1245Z 15 SCT M45 BKN
   60 OVC 1/2R-F
   68/35 2115G20
   992

1345Z E35 BKN M80
   OVC 2RW 65/34
   2118/992
```

If included in the stored weather information, NOTAMS and PIREPS weather information also can be displayed for terminal areas as illustrated by the two screens shown below.

```
       KSNA NOTAMS 04MAR83

SNA ILS RW19R OTS
   UNTIL 0200Z
```

```
       KSNA PIREPS   04MAR83

TYPE AIRCRAFT PA34
   TIME RECEIVED 1320Z

REPORT: CLOUD BASES
   3000 MSL. CLOUD TOPS
   11000 MSL. NO ICE.
```

When the option "5 WINDS ALOFT" is selected on the master menu, CRT 84 of CDU 12 display menu screen of the type shown below to permit selection of a particular navigation point.

```
          WINDS ALOFT

ENTER DESIRED #

1 SNA           7___
   2 TRM           8___
   3 PRC           9___
   4 TBC          10___
   5 GUC          11___
   6 DEN          12___
```

Once the navigation point such as "4" (TBC) has been selected from the menu in the above screen, the wind direction, wind speed and air temperature at various altitudes for the selected navigation point are displayed as shown by the screen below.

```
         TBC WINDS ALOFT 18000      240/22      −20
     24000      240/41      −38
     29000      250/55      −45
     31000      250/60      −51
     33000      260/71      −55
     35000      260/80      −58
     37000      270/85      −60
     39000      270/93      −62
```

Updating the information in the onboard navigation system from the data center 30 can be accomplished by selecting option "6 UPDATE" of the master menu. When this option is selected, a menu screen of the type shown below permits the pilot to select the particular update in which he is interested.

```
              DC UPDATE

ENTER DESIRED #
           1 WX ONLY
           2 MSG ONLY
           3 WX & MSG
           4 WX & FPL
           5 WX & FPL & MSG
```

The first screen for the flight pla (FPL) update procedure is illustrated below.

```
            DC FLT PLAN UPDATE

RTE CHANGE? Y(Y/N)

FL CHANGE? Y(Y/N)

NEW FLT LVL 330

INSERT NEW FLT LVL
          AND PRESS ENTER
```

Requesting additional weather can be accomplished by the pilot utilizing the menu screen below to specify navigation areas for which he is interested in a weather update.

```
              ENROUTE WX

ENTER AREA ID

1 SFO         7___
          2 SLC         8___
          3 DFW         9___
          4 MIA        10___
          5 BOS        11___
          6___         12___
```

Another feature of the flight planning and information system is the ability to transmit messages from and to the aircraft 10 by using the data management unit VHF receiver-transmitter (FIG. 3) and the ground based VHF transmitting-receiving facility 36 shown in FIG. 1. The navigation system control and display unit 12 can be utilized by the pilot to send a message to the data center 30 by entering it on the CRT 84 by operation of the CDU keyboard. An example of such a message is shown on the screens below.

```
                MESSAGE
```

```
              -continued
            TO: ABC FLT OPS
            #: TELEX 681340

PLS ARR GND TRANS

SEND MESSAGE?
```
```
            PLS ARR GND TRANS
            FOR 6 TO HYATT
            ETA FOR DAL IS 1400
            ALSO PLS HAV MECH
            AVAIL TO DISCUSS POS
            MAINT PROB

SEND MESSAGE ?
```

This message is transmitted from the CDU 12 through the data management unit 20 and ACARS system to the data center 30. In a similar manner messages can be transmitted to the aircraft 10 from the data center 30.

A further understanding of the flight planning system of FIG. 1 can be had with reference to FIGS. 5 through 14, which depict operational sequences for: (a) establishing one or more desired flight plans with portable computer 40 and flight data center 30; (b) loading of the flight plans established with portable computer 40 into data transfer unit 18 and data management unit 20 of aircraft 10; (c) operating the portion of the flight planning system that is onboard aircraft 10 to review flight plans and associated weather information that has been loaded into the aircraft flight planning system; (d) operating the system to obtain more recent flight plan and weather information for a flight plan while the aircraft is enroute; and (d) operating the flight planning system to update or modify a flight plan so as to include, for example, a different destination, different waypoints, of a required change of altitude. As shall be described in the following paragraphs, the embodiment of the invention associated with FIGS. 5 through 14 in some respects differs from the embodiments previously described herein. More specifically, the embodiments associated with the operational sequences depicted in FIGS. 5 through 14 are arranged to more fully integrate operation of the airborne portion of the flight planning system with operation of the aircraft flight management (navigation) system. To achieve this higher degree of integration, the embodiments associated with FIGS. 5 through 14 present flight plan information in a somewhat different format than the embodiments previously discussed herein and, also are organized in a somewhat different manner relative to operation for obtaining updated flight plan and weather information and for establishing a modified or new flight plan while the aircraft is airborne.

Figure 5A:
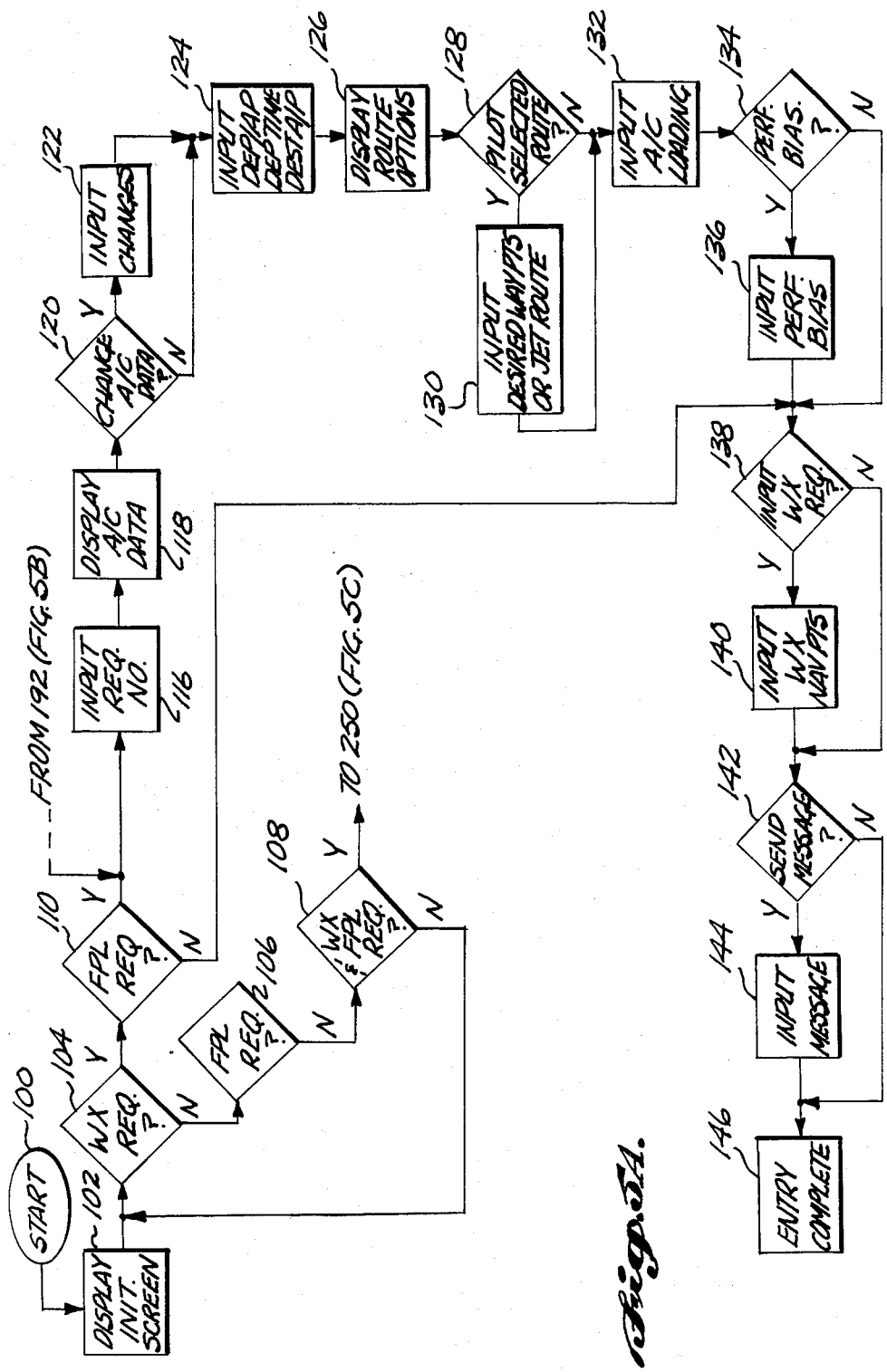
FIG. 5A is a flow chart that illustrates entry of flight plan input information into the portable computer of FIG. 1.

Referring now more specifically to FIGS. 5 through 14, FIG. 5A illustrates operation of portable computer 40 when the flight plan input information is entered into portable computer 40 for establishing a flight plan and-/or obtaining weather information when portable computer 40 later establishes data communication with flight data center 30 of FIG. 1. In the sequence of FIG. 5A, when the portable computer 40 is energized (indicated at start block 100 in FIG. 5A), an initialization screen is generated for display on liquid crystal display 42 of CDU 12 (indicated at block 102 in FIG. 5A). In the currently preferred embodiments of the invention, the initialization screen provides three options: "1 WEATHER AND FLIGHT PLAN REQUEST," "2 WEATHER ONLY REQUEST" and "3 WEATHER AND FLIGHT PLAN REVIEW." Instructions displayed on the initialization screen prompt the pilot to key-in numeral for the desired action and to depress an "ENTER" key that is located on keyboard 44 of portable computer 40.

When the desired option has been entered, portable computer 40 sequences to detect which option has been selected. In the arrangement of FIG. 5A, this sequence is indicated by decisional blocks 104 through 108. In this sequence, it is determined at block 104 whether a request for weather information has been made. If there is no request for weather information, it next is determined whether a request for a flight plan has been entered (decisional block 106). If a flight plan request has not been made, it next is determined whether the selected option is for review of weather and flight plan data that was previously stored on a magnetic disk 54 of computer 40 (decisional block 108). If this option has not been selected, portable computer 40 returns to decisional block 104. If the option to review previously stored weather and flight plan information has been selected, portable computer 40 sequences to display weather and flight plan information in the manner described hereinafter relative to FIG. 5C.

In the event it is determined that decisional block 104 that weather data is to be requested from flight data center 30 (FIG. 1), portable computer 40 next determines whether a flight plan request is also being made (indicated at decisional block 110 in FIG. 5A). If only a request for weather information has been entered, portable computer 40 advances to decisional block 138 of FIG. 5A to begin the weather request sequence that is described hereinafter.

If it is determined at decisional block 110 that both a weather request and a flight planning request are being made, portable computer 40 next displays a screen requesting that the pilot key in the aircraft registration number and depress the ENTER key (indicated at block 116 in FIG. 5A). As is indicated at block 118, portable computer 40 next displays eight aircraft information items: aircraft type, aircraft basic operating, weight, aircraft taxi fuel allowance, the desired minimum fuel reserve, the preferred true airspeed (TAS) for the aircraft, the aircraft per hour direct operating cost, the fuel cost per gallon and the maximum amount of fuel that can be carried by the aircraft. In the currently preferred embodiments of the invention, the first four information items are listed beneath a legend indicating that the information is required in order to establish a flight plan and the last four information items are listed beneath a legend indicating that entry of these items are optional. As is indicated at decisional block 120, the pilot indicates whether changes in the displayed values for the information items are required. In the currently preferred embodiments of the invention, a prompt is provided on the screen that lists the information items, requesting entry of "Y" if one or more values are to be changed or entry of a "N" if no changes are required. In these embodiments of the invention, if changes are to be entered (block 122 of FIG. 5A), the portable computer 40 displays the eight information items and a message requesting that the pilot operate "arrow keys" of keyboard 44 to place a display cursor over the item to be changed, insert the amended data and depress the ENTER key. The displayed message also instructs the pilot to depress a "FORWARD" key of keyboard 44 when the desired changes have been entered.

After an entry of any necessary changes in the flight planning input information displayed at block 118 of FIG. 5A, portable computer 40 provides a display screen that requests entry of the departure airport, the planned departure time, and the destination airport (indicated at block 124 of FIG. 5A). The next screen displayed by portable computer 40 lists the flight planning options available. In the currently preferred embodiments of the invention, the options are "1 OPTIMIZE NAVAIDS & JET ROUTES," "2 JET ROUTES ONLY," "3 PILOT BIASED ROUTING" and "PREFERRED ROUTE." In these embodiments, when the flight planning options are displayed (indicated at block 126 of FIG. 5A), a message also is displayed requesting that the pilot key-in numeral associated with the desired flight planning option and depress the ENTER key. As is indicated at decisional block 128, if a pilot selected ("pilot biased") route is selected, portable computer 40 generates a display screen requesting entry of the navigation way points or jet routes desired by the pilot (indicated at 130 in FIG. 5A). In using such a display screen, the pilot operates keyboard 44 to enter the standard codes that identify the jet routes or waypoints the pilot wishes to use for a portion or all of the flight plan.

After entry of any desired waypoints or jet routes, the portable computer 40 generates a display screen requesting entry of the load being carried by the aircraft, including aircraft payload and the weight of fuel onboard the aircraft (at block 132 of FIG. 5A). In the currently preferred embodiments of the invention, the pilot may enter "0" fuel on board, in which case the flight data center 30 will determine the total fuel required. Next, as is indicated by decisional block 134 of FIG. 5A, the portable computer 40 generates a display screen requesting that the pilot indicate whether the flight plan is to be established in view of pilot selected constraints ("performance bias"). If performance bias to be entered, the portable computer 40 generates a display screen listing allowable bias categories and instructing the pilot to position the display cursor over entry fields that are positioned adjacent to various types of performance bias, enter the desired bias value, depress the ENTER key and, when all desired biases are entered, depress the FORWARD key of keyboard 44. In the currently preferred embodiments of the invention, the bias categories include the additional amounts of fuel and time to be expended in reaching the flight plan flight level, additional amounts of fuel and time to be expended in descending from the flight plan flight level when the planned destination is reached, a minimum and maximum flight level, pilot estimated head wind or tail wind component to override the flight data center 30 wind forecasts. The pilot may wish to override wind forecasts, for example, when preliminarily planning a future flight that will be made under different wind conditions.

Next, the portable computer 40 sequences to accept entry of the pilot's request for weather information. In the sequence of FIG. 5A, weather requests are entered by first determining whether the pilot wishes to make a weather request (indicated at decisional block 138) and, if so, generating a display screen for entry of the various navigation points for which weather information is desired. In the currently preferred embodiments of the invention, this is accomplished by first generating a display screen on portable computer 40 requesting that the pilot enter a "Y" (yes) or a "N" (no) to indicate whether a weather request is being made. If a weather request is being made, the portable computer 40 then generates a display screen having nine numbered fields located beneath three legends: "TERMINAL WEATHER", "AREA FORECAST" and "WINDS ALOFT". This display screen includes a request that the pilot position the display cursor over an available TERMINAL WEATHER, AREA FORECAST or WINDS ALOFT field and enter the identification code for each identifier for which that type of weather information is desired. As is the case with previously described data entry screens of the currently preferred embodiment, the message instructs the pilot to depress the ENTER key after each identification code is keyed in and to depress the FORWARD key when the entries are complete.

Following entry of the requested weather information, the portable computer 40 generates a display screen requesting that the pilot indicate whether a message is to be sent to flight data center 30 of FIG. 1 when the requested weather and/or flight plan data is transmitted to flight data center 30. If it is determined that a message is to be sent (block 142 of FIG. 5A), the portable computer 40 generates a display screen that allows entry of the message to be sent (indicated at block 144 of FIG. 5A). When any desired message has been entered by operation of keyboard 44 of portable computer 40, as "ENTRIES ARE COMPLETE" display screen is generated. In the currently preferred embodiments of the invention, this screen indicates that all entries have been made (all data required by data center 30 for generating the requested weather information and/or flight plan is stored on magnetic disk 54). In addition, this screen provides instructions for connecting the portable computer 40 to a conventional telephone circuit (e.g., telephone jack 50 of FIG. 1) and for dialing the telephone number of flight data center 30.

Figure 5B:
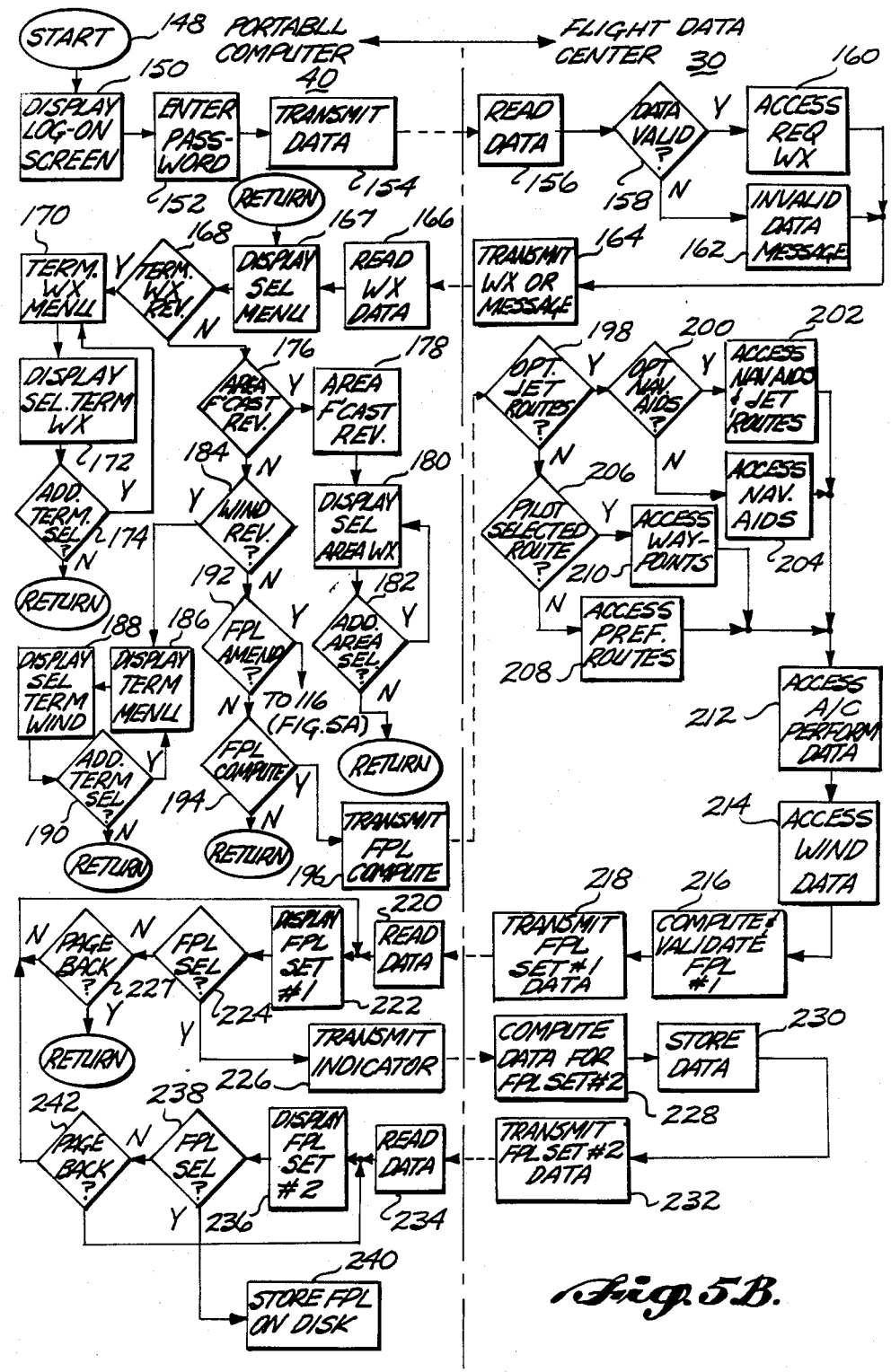
FIG. 5B illustrates the operating sequence of the portable computer and data center of FIG. 1 to establish a flight plan.

FIG. 5B illustrates the operational sequence of portable computer 40 and flight data center 30 for establishing a requested flight plan and storing the flight plan and requested weather information on disk 54 of FIG. 1 after the flight plan specification and weather request information have been entered during the sequence of FIG. 5A. As shall be described in detail in the following paragraphs, the sequence depicted in FIG. 5B permits the pilot to: (a) obtain and review requested weather information; (b) obtain a first set of flight plans that meet the specifications entered by the pilot during the sequence of FIG. 5A, with each flight plan reflecting a different aircraft cruise mode; (c) select the desired flight plan from the first set of flight plans and obtain a second set of flight plans for the selected aircraft cruise mode, with each flight plan of the second set reflecting different flight levels; and (d) select the desired flight plan of the second set of flight plans for storage on disk 54 of FIG. 1. In addition, the sequence of FIG. 5B provides the pilot the option of altering the flight plan specification (generating a revised flight plan) after a review of the requested weather or after a review of the first and second set of flight plans.

As is indicated by start block 148, the sequence of FIG. 5B begins when the pilot has connected the portable computer 40 to a telephone circuit and initiated telephone communication with the flight data center 30 in the manner described relative to FIG. 5A. When flight data center 30 has transmitted a signal indicating that telephone connection has been made, the portable computer 40 generates a display screen that allows the pilot to "log-on" the system (indicated at block 150) and enter a password (indicated at block 152). As is indicated at block 154, when the pilot has entered a password (e.g., a code that identifies the pilot as an authorized user), this information and the information entered during the sequence of FIG. 5A to specify the requested weather and flight plan are transmitted to flight data center 30. Flight data center 30 reads the data (indicated at block 156) and performs validation tests to determine whether valid log-on and password information are present (indicated at decisional block 158). In addition, in the currently preferred embodiments of the invention, the computers within flight data center 30 perform additional validation tests to determine whether the flight plan input information specified by the pilot is reasonable. For example, in the currently perferred embodiments of the invention, the flight data center 30 computes the sum of the basic operating weight and the payload (entered by the pilot during the sequence of FIG. 5A) to determine whether this sum exceeds the aircraft zero fuel weight (stored in the flight center aircraft performance database). Other pilot-entered flight planning input information such as the value for taxi fuel, reserve fuel and fuel onboard the aircraft are combined to determine whether the pilot entries are reasonable in view of the gross operating weight for that particular aircraft and the fuel capacity of the aircraft.

If it is determined at decisional block 158 that the pilot has entered valid log-on and password data and that the flight planning information entered by the pilot is reasonable in view of the stored performance characteristics for the aircraft, the computers within flight data center 30 access the requested weather and transmit weather data to the portable computer 40 (indicated at block 164, FIG. 5B). On the other hand, if it is determined at decisional block 158 that incorrect or unreasonable information has been entered by the pilot, the computers of flight data center 30 generate an appropriate message (indicated at block 162 of FIG. 5B), which is then transmitted to the portable computer 40 for display and corrective action by the pilot.

As is indicated at block 166, the data transmitted by the flight data center 30 is ready by the portable computer 40 and a menu screen is displayed to permit the pilot to review the requested weather or proceed to establish a flight plan (indicated at block 167 of FIG. 5A).

In the arrangement depicted in FIG. 5B, the selection menu displayed in association with block 167 includes options to:
(1) request that flight data center 30 establish a flight plan;
(2) utilize the portable computer 40 to review the requested terminal weather;
(3) utilize the portable computer 40 to review the requested area forecast;
(4) utilize the portable computer 40 to review the requested wind information; and
(5) utilize the portable computer 40 to amend the flight plan input information (i.e., establish an amended flight plan specification).

In the sequence depicted in FIG. 5B, if the pilot utilizes the menu displayed in association with block 167 to review requested terminal weather (indicated by decisional block 168 of FIG. 5B), the portable computer 40 next displays a terminal weather selection menu (indicated at block 170). This menu lists the identification codes for the terminals for which the pilot requested terminal weather information (during the sequence of FIG. 5A) and allows the pilot to select one of the terminal identifiers. When a terminal identifier has been selected, the portable computer 40 displays each surface observation report, terminal weather forecast, each conventional "Notices to Airmen" (NOTAMS) and each pilot observance report (PIREP) that has been provided by flight data center 30. In the currently preferred embodiments of the invention, flight data center 30 obtains the terminal weather information from the National Weather Service and commercial suppliers of such information, updating portions of the terminal weather information on an hourly basis.

As is indicated by decisional block 174 of FIG. 5B, when the terminal weather for the selected terminal has been reviewed, the pilot can operate the portable computer 40 to return to the terminal weather menu (block 170) for display of additional terminal weather information, or can return to the display selection menu (block 167).

As is indicated by blocks 176, 178, 180 and 182 of FIG. 5B, if the pilot utilizes the displayed selection menu (block 167) to select review of a requested area forecasts, the portable computer 40 sequences in a manner similar to the sequence described relative to review of terminal weather. In this regard, the portable computer 40 displays an area forecast menu (indicated at block 178), which allows the pilot to select one of the areas for which a forecast has been requested. The area weather forecast for the selected area is then displayed (indicated at block 180) and the pilot can operate the portable computer 40 to either select and display additional area forecasts or return to the selection menu which allows the pilot to select a different weather review or select a different function (indicated at decisional block 182 of FIG. 5B). In the currently preferred embodiment of the invention, flight data center 30 is connected to the U.S. National Weather Service and commercial suppliers of weather data to maintain an area weather forecast database that includes twelve hour forecast for weather hazards, weather synopsis, turbulence and icing levels as well as an eighteen hour significant cloud and weather forecast. Updates to the area weather database are made twice per day.

With continued reference to FIG. 5B, when the pilot utilizes the selection menu indicated at block 167 to initiate a review of the requested wind information, the portable computer detects the pilot selection (at block 184), displays a selection menu that lists the identifiers for which the pilot has requested wind information (block 186) and permits the pilot to display the wind conditions for any or all of the requested identifiers (blocks 188 and 190). In the currently preferred embodiments of the invention, the flight data center 30 receives wind forecasts for nearly four thousand locations twice each day. This wind forecast information is maintained in a database that provides forecasted wind direction, speed and outside air temperature for various altitudes.

When any desired review of the requested weather information is complete, the pilot can utilize the selection menu (indicated at block 167) to amend the requested flight plan (indicated at decisional block 192) or to request computation of a flight plan based on the flight plan information input entered during the sequence of FIG. 5A (indicated at decisional block 194 of FIG. 5B). If the pilot wishes to amend the flight plan specification information because of formidable weather forecasts or other reasons, the portable computer 40 is sequenced to return to the flight planning information input sequence of FIG. 5A. If the pilot initiates computation of a flight plan based on the previously entered flight planning information inputs, the portable computer 40 transmits a signal to flight data center 30 (as indicated at block 196 of FIG. 5B).

When the computers of flight data center 30 receive a signal indicating that the pilot has requested computation of a flight plan based on the flight planning information inputs that previously were transmitted to the flight data center 30, a sequence is executed to determine which flight plan option the pilot selected during the flight planning information sequence of FIG. 5A. As previously discussed, in the currently preferred embodiments of the invention these options include optimization of the flight plan relative to navigational aids and established jet routes; optimization of the flight plan relative to only jet routes; optimization of a flight plan that is constrained according to flight bias information entered during the sequence of FIG. 5A; or optimization of a flight plan based on the current list of standard or preferred routes. In the sequence depicted in FIG. 5B, this determination is made by first determining whether the requested flight plan is to be optimized based on standard jet routes (determined at decisional block 198). If optimization is to be based on standard jet routes, it is next determined whether the optimization is also to be based on navigational aids (at decisional block 200). If only jet route optimization is requested, the computers sequence to access the database files that include conventional navigation aid information (block 204). If a flight plan is to be established with optimization with respect to both jet routes and navigational aids, the computers of the flight data center 30 sequence to access the files of both the navigational aid and jet route database. As is indicated by decisional block 206 of FIG. 5B, if it is determined at decisional block 198 that the flight plan is not to be optimized with respect to jet routes, the computers of flight data center 30 are sequenced to determine whether the flight plan is to be established based on navigation points entered by the pilot (pilot selected routing). If pilot selected flight planning information was entered during the sequence of FIG. 5A, the computers of flight data center 30 sequence to access database files which include the pilot selected waypoints (indicated at block 210). If the flight plan is not to be optimized in view of jet routes (determined at decisional block 198) or constrained by pilot biased routing (determined at decisional block 206), the pilot has selected optimization with respect to preferred routes and the computers of the flight data center 30 sequence to access database files that provide information relative to the standard, preferred routes.

As is indicated at blocks 212 and 214 of FIG. 5B, once the flight plan optimization option selected by the pilot is determined and appropriate database files are accessed, the computers of flight data centers 30 sequence to access database files that include aircraft performance data for the aircraft of interest and database files that include wind data.

As is indicated at block 216 of FIG. 5B, the computers of flight data center 30 next are sequenced to determine a set of flight plans that are optimized in the selected manner for a number of aircraft cruise modes. As was mentioned previously, in the currently preferred embodiments of the invention, this set of flight plans (FPL SET #1, in FIG. 5B) includes the high-speed cruise cruise mode for the particular aircraft, the long-range cruise cruise mode for the particular aircraft, and the value of preferred true airspeed entered by the pilot during the sequence of FIG. 5. In determining the first set of flight plans, the computers of flight data center 30 first utilize the route options selected by the pilot during the sequence of FIG. 5A to determine an optimal flight plan route between the departure and destination airports. When the pilot has selected a flight plan optimized with respect to both navigation aids and jet routes, or a flight plan optimized with respect to jet routes only, the computers of flight data center 30 sequence to establish the most advantageous flight plan route based on the wind forecast for available navigation aids and jet routes (i.e., take maximum advantage of forecasted tail winds and/or minimize the effect of forecasted headwinds). Once the flight plan for the route option selected by the pilot is established, the computers of flight data center 30 are sequenced to determine the "minimum fuel altitude" (i.e., the flight level that minimizes the fuel required to climb from the departure airport, cruise, and descend at the destination airport), for each of the three above-mentioned aircraft cruise modes. In the currently preferred embodiments of the invention, for each of the three aircraft cruise modes, the computers of flight data center 30 provide the calculated minimum fuel altitude, true airspeed at the beginning and end of the cruise portion of the planned flight, the estimated time required to navigate the planned route, the forecasted fuel burn, and the estimated cost. As is known in the art, the planned true airspeeds can be determined in view of the aircraft performance data, taking into account the cruise mode, flight level, outside air temperature and aircraft weight. The estimated costs can be calculated based on the direct operating costs of the aircraft and fuel price per gallon in view of the estimated time required to navigate the planned route and the fuel price per gallon.

Once the various information items have been determined for the first set of flight plans, the associated data is transmitted by the flight data center 30 to portable computer 40 (indicated at block 218 of FIG. 5B). Portable computer 40 then reads the data (indicated at block 220) and generates a display screen that allows the pilot to evaluate the flight plans for the three aircraft cruise modes. For example, in the exemplary display screen illustrated below, high-speed cruise, preferred true airspeed and long-range cruise flight plans have been established by flight data center 30 for a route that begins at Los Angeles International Airport (KLAX), includes ten intermediate waypoints, and terminates at Chicago-/O'Hare Field (KORD). It can be noted in the example display that the aircraft cruise mode that results in the shortest estimated time and route (preferred TAS option) does not result in the lowest estimated cost because the estimated fuel consumed for this cruise mode exceeds the estimated fuel consumption for the high-speed cruise cruise mode option. Further, in the example shown, the long-range cruise option results in both the highest estimated time in route and the highest cost even though the estimated fuel consumption is less than the other two options. The discrepancy between the estimated cost of the long-range cruise option and the two other options results since the cost estimate is based both on aircraft direct operating cost and fuel cost.

| ROUTE: KLAX-HEC-LAS-BCE-HVE-EKR-CYS-SNY-OBH-DSM-IOW-KORD | | | | | |
|---|---|---|---|---|---|
| | FLT LVL | TAS | TIME | FUEL | COST |
| 1 HIGH SPEED CRUISE: | 450 | 427/446 | 3+15 | 4000 | $4311 |
| 2 PREFERRED TAS: | 410 | 430/430 | 3+13 | 4115 | $4317 |
| 3 LONG RANGE CRUISE: | 410 | 373/373 | 3+30 | 3843 | $4524 |

When the information for the three cruise modes has been examined, the pilot can select the desired aircraft cruise modes by keying in the identification numeral of the desired cruise mode and depressing the enter key of keyboard 44 or, alternatively, can operate portable computer 40 to amend the flight plan. In the sequence depicted in FIG. 5B, at decisional block 224 it is determined whether the pilot has selected one of the three displayed cruise modes and, if so, a signal representative of the selected cruise modes is transmitted to flight data center 30 (indicated at block 226 of FIG. 5B). As is indicated at decisional block 227, if the pilot has not selected one of the displayed cruise modes, portable computer 40 determines whether the pilot has operated keyboard 44 in order to amend the flight plan specifications and obtain a new first set of flight plans. If this action is taken, portable computer 40 recycles to the screen that allows the pilot to initiate a flight plan amendment (block 167 of FIG. 5B).

When the pilot has selected one of the three aircraft cruise modes and portable computer 40 has transmitted a signal that indicates the pilot's selection, flight data center 30 computes a second set of flight plans based on the selected aircraft cruise mode (indicated at block 228 of FIG. 5B). In the currently preferred embodiments of the invention, the second set of flight plans includes the minimum fuel altitude flight plan for the selected cruise mode and two optional flight plans for the two next lower altitude standard flight levels for the direction of flight. In addition, the computers of flight data center 30 determine the distance between the origin and destination airports via the flight plan route, the estimated time required to fly the flight plan, the predicted fuel consumption and the predicted cost of the flight.

The second set of flight plans is read by portable computer 40 (indicated at block 234 of FIG. 5B) and displayed on the computer display unit (indicated at block 236). In the exemplary display shown below, the "MINIMUM FUEL" option corresponds to the high-speed cruise option shown in the previously discussed exemplary display of the first set of flight plans. In this example, it can be noted that, although the estimated time enroute for the two next-most available lower altitudes ("FLT LVL 410" and "FLT LVL 370") is less than the estimated time enroute for the minimum fuel altitude, the lower altitude flight plans result in significantly higher fuel consumption. However, as shown by the predicted "COST," in this particular case, the predicted time enroute for flight level "410" (41,000 feet) results in cost savings (reduced direct operating cost for the flight) that more than offsets the cost of the additional fuel consumed.

| KLAX-KORD: HIGH SPEED CRUISE | | | | | |
| --- | --- | --- | --- | --- | --- |
| | FLT LVL | TAS | TIME | FUEL | COST |
| 1 MINIMUM FUEL | 450 | 427/446 | 3+15 | 4000 | $4311 |
| 2 FLT LVL OPTION 2 | 410 | 449/465 | 3+04 | 4438 | $4259 |
| 3 FLT LVL OPTION 3 | 370 | 461/474 | 3+00 | 4949 | $4328 |

Returning again to FIG. 5B, when the second set of flight plans is displayed, the pilot can select one of the flight plans or cause the portable computer 40 to display the first set of flight plans. If the pilot selects a flight plan from the second set of flight plans (indicated at decisional block 238), the complete flight plan is sent and stored on disk 54 for subsequent use on the aircraft (indicated at block 240). If the pilot operates keyboard 44 to return to the display of the first set of flight plans (indicated at decisional block 242), keyboard 44 of the portable computer 40 can be operated to either select a different aircraft cruise mode or return to the selection menu that will allow the pilot to amend the flight plan specification information.

Figure 5C:
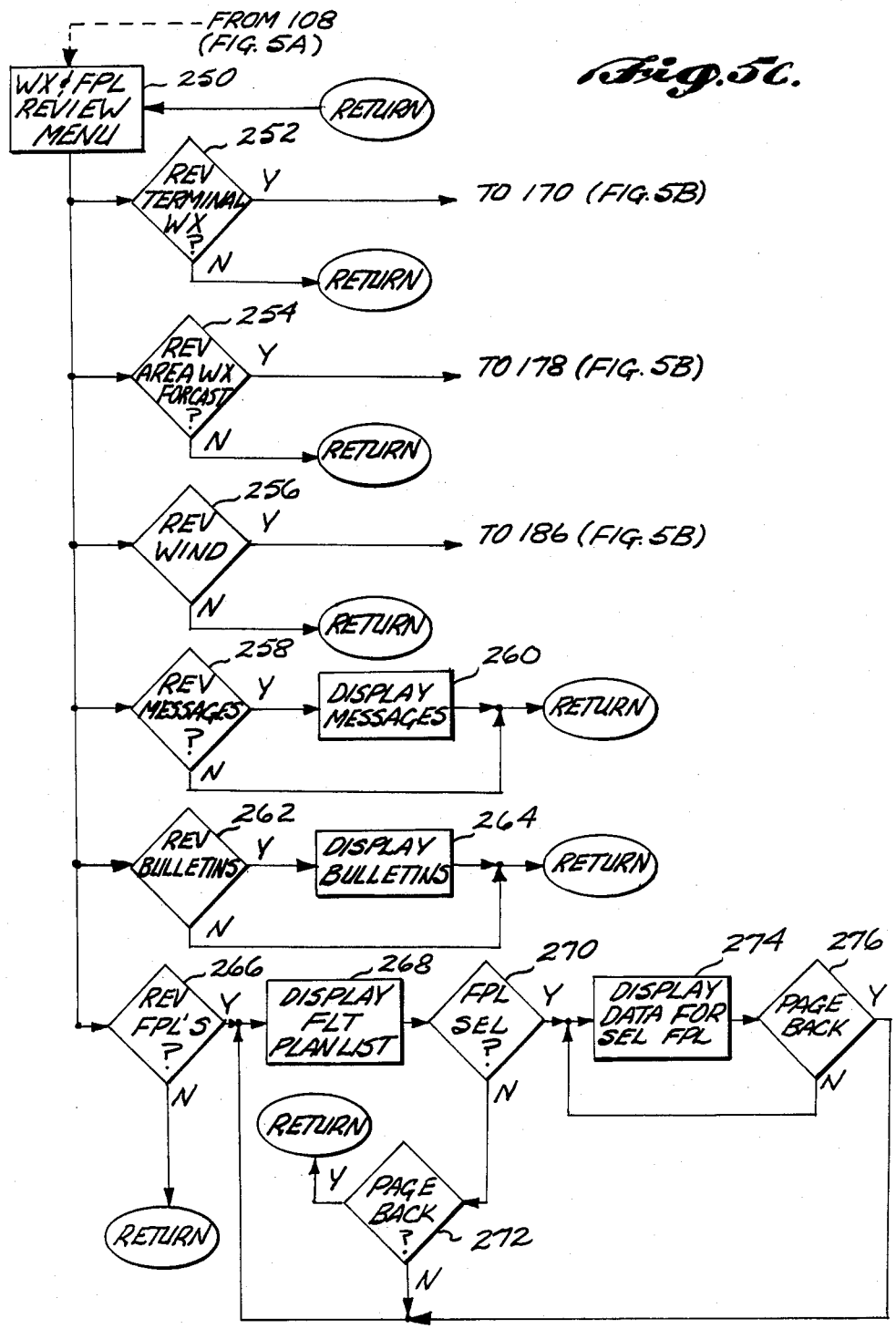
FIG. 5C is a flow chart that illustrates operation of the portable computer for reviewing a flight plan established in accordance with the sequence depicted in FIG. 5B.

As previously was described, after one or more flight plans have been stored on disk 54, the flight plan and the associated weather information can be viewed without the portable computer 40 being in data communication with the flight data center 30. As was indicated relative to the sequence depicted in FIG. 5A, such a review is initiated by selecting the "WEATHER AND FLIGHT PLAN REVIEW" option when the portable computer initialization screen is displayed (block 108 in FIG. 5A). As is indicated in FIG. 5C, selecting this option causes the portable computer 40 to display a weather and flight plan review menu which permits the selection of flight plan review, terminal weather review, area forecast review, winds aloft (wind forecast) review, and review of any messages or bulletins that were transmitted to the portable computer 40 while it was in data communication with flight data center 30. As is indicated by decisional block 252 of FIG. 5C, if the option to review terminal weather is selected, the portable computer 40 sequences to block 170 of FIG. 5B to display the terminal weather information stored on disk 54 in the previously described manner. As is indicated by decisional blocks 254 and 256 of FIG. 5C, a review of the area forecast and the wind forecast information is initiated in a similar manner, with selection of an area weather review causing portable computer 40 to return to block 178 of FIG. 5B and, selection of a winds aloft review causing the portable computer 40 to recycle to block 186 of FIG. 5B. Alternatively, if keyboard 44 of portable computer 40 is operated to display messages (indicated at block 258 of FIG. 5C), messages transmitted to portable computer 40 during the time period in which portable computer 40 was in data communication with flight data center 30 are displayed on the portable computer display unit 84 (indicated at block 260). As is indicated by decisional block 262 and block 264 of FIG. 5C, bulletins transmitted to portable computer 40 during the time in which it was in data communication with flight data center 30 can be displayed by selecting the review bulletin option on the weather and flight plan review menu (block 250). As is known in the art, such bulletins are routinely issued by remote computer and database services such as flight data center 30 to inform users of changes in the database or provide other information of interest.

As is indicated by decisional block 266 of FIG. 5C, if the pilot selects the option to review flight plans, portable computer 40 displays a list of all flight plans stored on the disk 54 that is resident in disk drive 52 of the portable computer (indicated at block 268). This display lists the origin and destination points for each stored flight plan, and the date and time at which each flight plan was established by data control center 30. If the pilot utilizes keyboard 44 to select one of the displayed flight plans (decisional block 270), the portable computer 40 displays the flight plan number assigned by flight data center 30, the flight planning information input that formed the specification for the flight plan, the estimated time of departure, the total fuel required, the total time enroute, takeoff and landing weights, fuel reserves and the waypoints that define the various legs of the flight plan. In addition, each leg of the flight plan is displayed with the flight distance for that leg, flight level, magnetic course, the estimated time enroute for that leg, the forecasted fuel burn for that leg, forecasted fuel flow per engine, forecasted true airspeed and true ground speed, forecasted wind conditions, predicted outside air temperature and the forecasted remaining fuel, total time enroute and total distance. Even further, in the currently preferred embodiments of the invention, the geographical coordinates of the departure and arrival points and each waypoint are transmitted to portable computer 40 when the flight plan is established and are displayed as a portion of the flight plan review information.

As previously was mentioned, one advantage of the invention is that the flight plans stored on a disk 54 can be inserted in the data transfer unit 18 of FIG. 1 and automatically entered into the flight management computer 14 via the data management unit 20. In the simplified flow chart depicted in FIG. 6, the sequence for loading the flight plan and weather information stored on a disk 54 begins at start block 278 each time operating power is supplied to flight management computer 14 and data management unit 20. In the depicted sequence, it is initially determined whether a disk 54 has been inserted into data transfer unit 18 (indicated at decisional block 280). If a disk was not inserted into the data transfer unit 18 prior to system powerup (or if an inserted disk 54 cannot be read), the processor unit 74 of data management unit sequences to format a "FLT PLAN LIST" page for display of a "NO DISK" message. In the previously mentioned applications of the invention wherein CDU 12 and flight management computer 14 are components of the GNS—1000 Flight Management System that is manufactured by Global Systems, Inc., both data management unit 20 and flight management computer 14 generate a flight plan list page. In this arrangement, the flight planning system FLT PLAN LIST page is automatically displayed on CDU 12 when the data management system is initialized by operation of CDU 12 (entry of date, time and aircraft position). Additionally, processor unit 74 of data management unit 20 is sequenced to display the flight planning system FLT PLAN LIST on CDU 12 when preselected CDU keys are depressed.

Figure 6:
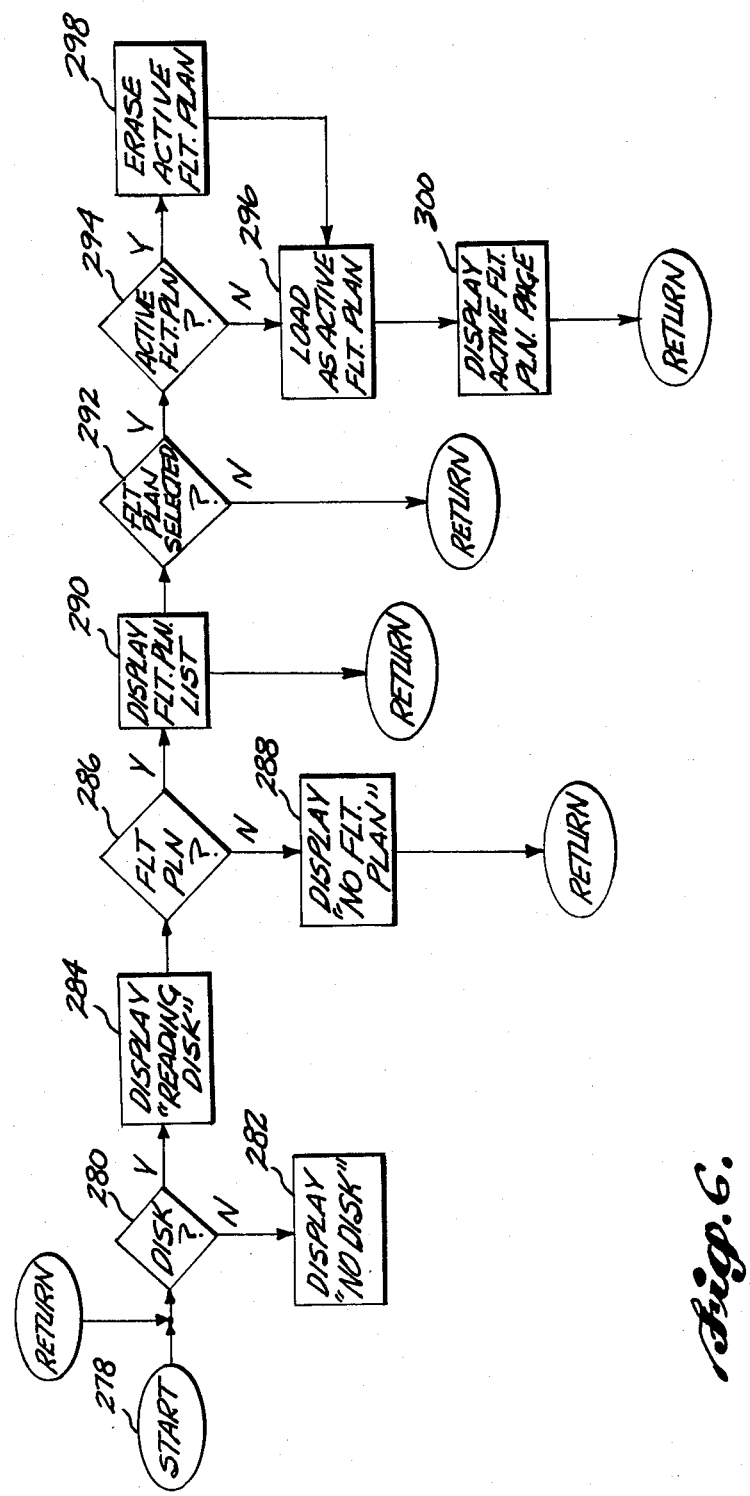
FIG. 6 is a flow chart that illustrates operation of the invention when flight plans are loaded into the portion of the flight planning system that is located on the aircraft.

Continuing with the description of the flight plan and weather information loading sequence of FIG. 6, if a disk 54 was inserted in data transfer unit 18, processor 74 of data management unit 20 formats the flight planning system FLT PLAN LIST page for display of a "READING DISK" message (indicated at block 284 of FIG. 6). As is indicated by decisional block 286 and block 288 of FIG. 6, if no weather or flight plan information can be read from the disk 54, the processor 74 of data management unit 20 formats the flight planning system FLT PLAN LIST page for display of a "NO FLT PLANS ON DISK" (no flight plan) message. If flight plan data can be read from disk 54, the processor 74 of data management unit 20 formats the FLT PLAN LIST page for identification of each flight plan that is read by data transfer unit 18 and transferred to data management unit 20 (indicated at block 290 of FIG. 6). In an arrangement in which display 84 of CDU 12 has an eight-line display capability, the first line of this display is a legend that identifies the display as the flight planning system flight plan list and lines 3 through 7 are available for displaying the origin, destination and date for five flight plans. As shall be described relative to decisional block 294 of FIG. 6, the eighth line of the CDU display is utilized when the system is operated to adopt one of the displayed flight plans as the active flight plan for the flight management computer 14. If more than five flight plans are read from disk 54, additional FLT PLAN LIST pages are formatted by data management unit 20 and can be accessed by operating the keys of CDU 12 (e.g., the display can be sequenced through the flight plan list pages by operating the "FPL" key 85 of CDU 12 (FIG. 4).

To adopt one of the flight plans listed on the flight planning system FLT PLAN LIST page as the active flight plan for flight management computer 14 of FIG. 1, the pilot positions a cursor that is displayed on CDU 12 over the departure and destination identifiers of the desired flight plan (using "UP ARROW" and "DOWN ARROW" keys 86 and 88 of CDU 12) and activates the CDU ENTER key (90 in FIG. 4). As is indicated by decisional block 294 and block 296 of FIG. 6, if another flight plan has not already been designated the active flight plan for flight management computer 14, the selected flight plan is loaded into flight management computer 14 to become the active flight plan. If the flight management computer 14 already has an active flight plan, processor unit 74 of the data management unit sequences to display the prompt "REPLACE ACTIVE FPL?" on the eight (bottom) line of the flight planning system FLT PLAN LIST page with the cursor being positioned over the prompt. If the pilot then depresses ENTER key 90 of CDU 12, the current active flight plan is erased (indicated at block 298 of FIG. 6) and the flight plan selected from the flight planning system FLT PLAN LIST page is loaded into flight management computer 14 as the active flight plan.

When the selected flight planning system flight plan has been transferred to the flight management computer 14 in the above-described manner, the flight management system active flight plan page is displayed (indicated at block 300 of FIG. 6) and the flight management system can be operated in the normal manner.

Whenever the active flight plan of the flight management computer 14 is a flight plan that was established by the flight data center 30 and loaded into flight management computer 14 and data management unit 20 in the above-described manner, the onboard components of the system of FIG. 1 can be operated to provide an ongoing comparison of actual and planned progress data as the aircraft navigates the planned route. In the earlier-described embodiments of this invention, such progress monitoring is initiated by accessing the flight management system master menu and selecting the "FPL PROGRESS" option. In embodiments of the invention in which the flight planning system is more fully integrated with the aircraft flight management (navigation) system, the flight plan progress option is accessed in a different manner and provision is made for additional flight plan progress displays. In this regard, in the currently preferred realizations of the more fully integrated embodiments of the invention the flight plan progress display page is formatted as a particular page (e.g., "Page 5") of the previously mentioned GNS-1000 Flight Management System. To select the flight plan progress option in this particular arrangement, the pilot selectively operates the keys of CDU 12 (e.g., by depressing the NAV key 92 of CDU 12) of FIG. 4 to display the first navigation page and by repeatedly depressing the NAV key 92 to advance the display to Navigation Page 5. As is indicated by block 302 of the sequence diagram shown in FIG. 7, when the pilot attempts to select Navigation Page 5, flight management computer 14 sequences to determine whether the active flight plan of the aircraft navigation system is a flight plan provided by the flight management system (indicated at decisional block 304). If the active flight plan corresponds to one of the flight planning system flight plans, it is next determined whether the leg of the flight plan that currently is being navigated corresponds to a leg of the flight planning system flight plan (indicated at decisional block 306). If the flight plan leg being navigated by the aircraft corresponds to a leg of the flight planning system flight plan, it is next determined whether the pilot has operated the keys of CDU 12 to review flight plan data associated with a past or future leg of the flight plan (decisional block 308). If the pilot has not opted to review a past or future flight plan leg, data management unit 20 is sequenced to format information for display on CDU 12 (indicated at block 310 in FIG. 7). The currently preferred eight-line format for displaying flight plan progress data relative to the current leg of an active flight plan is shown below.

| LVS:LBL | | FL 370 |
|---|---|---|
| | P | A |
| F REM | 19732 | 19825 |
| FF P/E | 2354 | 2325 |
| ETA | 22:44 | 22:43 |
| TAS | 464 | 465 |
| GS | 591 | 605 |
| WIND | 250/128 | 240/141 |

In the above display format, the first line displays the current "from" and "to" leg identifiers and the planned flight level "FL" (as established by the flight data center 30 when the flight plan was generated). Lines 3 through 8 are divided into three columns with the first column displaying the legends "F REM" (fuel remaining); "FF P/E" (fuel flow per engine); "ETA" (estimated time of arrival); "TAS" (to air speed); "GS" (ground speed); and, "WIND" (direction and speed). Appearing on line 2 of the flight plan progress page and centered over the second column of the display is the identifier "P" (planned). Line 2 of the display also includes the identifier "A" (actual), which is centered over the third column of the display.

In operation, the actual values of the indicated data items are provided by flight management computer 14, which receives or generates these data items in its normal navigation capacity. The values for planned fuel flow per engine, planned true air speed, planned ground speed and planned wind direction and speed are available since each of these data items is included in the flight plan data established by flight data center 30 of FIG. 1 when the flight plan was formulated. In formatting the data for display (block 310 of FIG. 7), the data management unit 20 selects the data values appropriate to the flight plan leg being navigated and causes those values to be displayed without change as long as that leg remains the current flight plan leg. On the other hand, to permit the pilot to continuously compare the planned and actual fuel remaining and to compare the planned estimated time of arrival with the estimated time of arrival predicted by Flight Management Computer 14, the planned fuel remaining and the planned ETA are repeatedly computed based on relevant flight plan data and the progress being made along the planned route.

Figure 7:
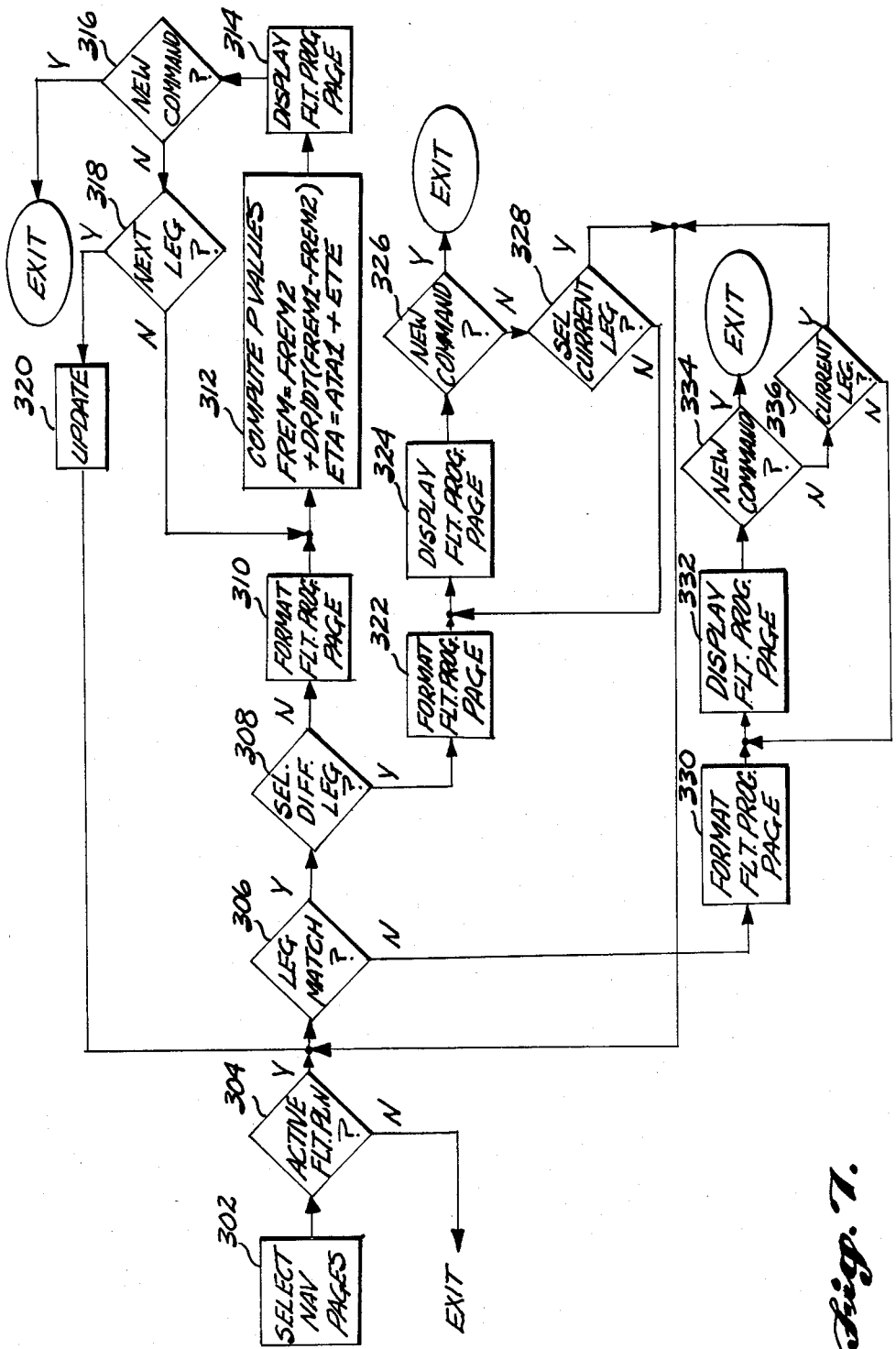
FIG. 7 depicts the operating sequence of the invention relative to displaying progress of the aircraft along a flight plan that is established in accordance with the invention.

As is indicated in block 312 of FIG. 7, a satisfactory method for computing the planned fuel remaining value as the aircraft progresses along the flight plan leg is given by the equation:

$$FREM = FREM\ 2 + DR/DT\ (FREM\ 1 - FREM\ 2)$$

where, FREM 1 and FREM 2, respectively denote the planned fuel remaining at the beginning and end of the flight leg (included in the flight planning data provided by flight data center 30); DR denotes the distance of the terminus of the flight leg ("distance remaining"; which is determined by Flight Management Computer 14 during normal operation); and, "DT is the total flight leg distance (included in the flight planning data provided by flight data center 30 when a flight plan is established.

As also is indicated at block 312 of FIG. 7, a suitable method for determining the planned ETA as the aircraft progresses along the flight plan leg is given by the expression:

$$ETA = ATA1 + ETE$$

where, ATA1 denotes the time at which the aircraft arrived over the origin of the flight leg (the "FROM" waypoint) and ETE denotes the predicted estimated time enroute (provided by flight data center 30 when the flight plan is established).

Continuing with description of the sequence diagram depicted in FIG. 7, as is indicated by block 314 and as shown in the exemplary screen described above CDU 12 displays the planned progress and actual progress values for each of the above discussed data items. In this data, current values of planned fuel remaining and planned estimated time of arrival are provided along with current actual values for each of the indicated flight planned data items. Thus, the displayed values for these data items change as the aircraft progresses along the flight leg. As is indicated at decisional block 316 of FIG. 7, the system monitors the signals provided by the keys of CDU 12 to detect whether the pilot has operated CDU 12 to generate a command for causing the system to operate in a mode other tham monitoring of the flight plan progress. If such a command has been issued, the sequence of FIG. 7 is terminated and flight management computer 14 and/or data management unit 20 are sequenced to operate in the newly selected mode. If the pilot has not initiated operation in a different mode, it is next determined (at decisional block 318) whether the aircraft has passed over the terminus of the flight leg being monitored (i.e., has started the next flight leg of the flight plan). If the aircraft is still navigating along the original leg of the flight plan, new values of the planned fuel remaining and planned estimated time of arrival are determined (at block 312) and the display process continues. If the aircraft has progressed to the beginning of the next leg of the flight plan, the values for the planned flight data items that are not calculated (those other than planned FREM and planned ETE) are updated (at block 320 in FIG. 7), and the sequence is repeated from the determination of whether the current leg of the flight plan matches the leg being flown by the flight management (navigation) system (block 306 of FIG. 7).

As previously was mentioned, the sequence depicted in FIG. 7 allows the pilot to review flight plan data associated with past and future legs of the flight plan. In current realizations of the invention in which a data management unit 20 is used in conjunction with the CDU 12 and flight management computer 14 of the previously mentioned GNS-1000 Flight Management System, the review of past or future flight plan legs is initiated by positioning a cursor displayed on CDU 12 over the identifiers that represent the to and from navigation points of the current flight leg. With the cursor positioned, the pilot can repeatedly operate the ENTER key 90 of CDU 12 to access future flight legs or repeatedly operate the BACK key 94 to access successive past legs. Operation of CDU 12 in this manner will be detected at decisional block 308 of FIG. 7 and will cause data management unit 20 to reformat the displayed flight progress page (indicated at block 322). In particular, when the flight progress page for a future or past flight leg is displayed, no actual values for the previously discussed flight information items exist and data management unit 20 causes "dashes" to be displayed as the "actual value" of each flight data item. In addition, the previously discussed "FUEL REM" and the "ETA" legends are replaced by "FUEL REQ" (fuel required) and "ETE" (estimated time enroute), respectively. With the flight plan page formatted in this manner, the display 84 of CDU 12 displays only the previously discussed planned flight data items (as indicated at block 324 of FIG. 7). As is indicated at decisional block 326, if the pilot operates the keys of CDU 12 to initiate operation in some mode other than the flight progress mode, the sequence of FIG. 7 is terminated and flight management computer 14 and/or data management unit 20 operate to effect the selected mode of operation.

In the current realizations of the invention, when flight data items for a past or future flight leg are being displayed on the flight progress page, the pilot can initiate immediate display of the flight plan leg currently being flown by the aircraft by operating the UP ARROW key 86 or the DOWN ARROW key 88 of CDU 12 to remove the cursor from the displayed flight plan progress page. This action is detected at decisional block 328 of FIG. 7. If the pilot has not operated UP ARROW key 86 or DOWN ARROW key 88, the CDU 12 continues to display the selected past or future flight leg data items. If the pilot has operated the UP ARROW key 86 or the DOWN ARROW key 88 of FIG. 4 to remove the cursor from the page being displayed, the sequence for displaying both the planned and actual flight data items for the current leg is initiated by appropriately reformatting the flight plan progress page (at block 310 of FIG. 7).

Under certain circumstances, the flight leg being navigated by the aircraft will not correspond to a flight leg of the flight plan established by flight data center 30, even though the aircraft is following other flight legs of that flight plan. For example, the previously mentioned GNS-1000 Flight Management System and other commercially available navigation systems allow the pilot or a crew member to initiate a leg change without changing the entire flight plan route. In the sequence depicted in FIG. 7, such a condition is detected at decisional block 306, which determines whether the active flight plan leg of the flight management system corresponds to a leg of the flight planning system flight plan. When such a condition is detected, data management unit 20 formats the flight plan progress page so that dashes are displayed as the value of each planned flight plan data item. In addition, dashes are displayed for the value of the planned flight level (indicated at block 330 of FIG. 7). The CDU 12 then displays only the actual values for the flight data items. As is indicated by decisional block 234 of FIG. 7, if the pilot then operates the keys of CDU 12 to initiate a mode of operation other than the flight plan progress mode, the sequence of FIG. 7 is terminated and the flight management computer 14 and/or data management unit 20 sequenced to initiate the selected mode of operation. If such a mode change is not initiated, it next is determined whether the aircraft has reached the next leg of the flight path (decision block 336 in FIG. 7). If there is no change in the flight path leg being flown, CDU 12 continues to display only the actual values of the flight data items. If the aircraft has embarked on a new flight leg, the sequence depicted in FIG. 7 is repeated by determining whether the new flight path leg matches a leg of the flight planning system flight leg (determined at decisional block 306 of FIG. 7).

Having described the arrangement and operation of the currently preferred embodiments of the invention relative to establishing flight plans, loading the flight plans and associated weather information into onboard equipment of the aircraft, adopting a flight plan that was established by flight data center 30 (FIG. 1) as the active flight plan of the aircraft navigation system and monitoring aircraft progress along such an active flight plan, visions of the currently preferred embodiments of the invention shall be described relative to reviewing flight plans and associated weather data established by flight data center 30, updating such a flight plan and/or associated weather information and receiving and transmitting messages while the aircraft is airborne.

Each of the system operations to be described is initiated through the use of a master or main flight planning system menu, which is displayed on cathode ray tube 84 of control and display unit 12 (FIG. 4) when the keys of CDU 12 are operated to enter an appropriate selection code. The main menu for the flight planning system of the embodiments now being considered is shown below and differs somewhat relative to the previously described master menu of the earlier discussed embodiments.

```
FPS MENU 04MAR85

1 FLT PLAN
2 SIGMETS
3 TERMINAL WX
```

-continued

4 WINDS ALOFT
5 RECALL FPL
6 MESSAGES

Figure 8:
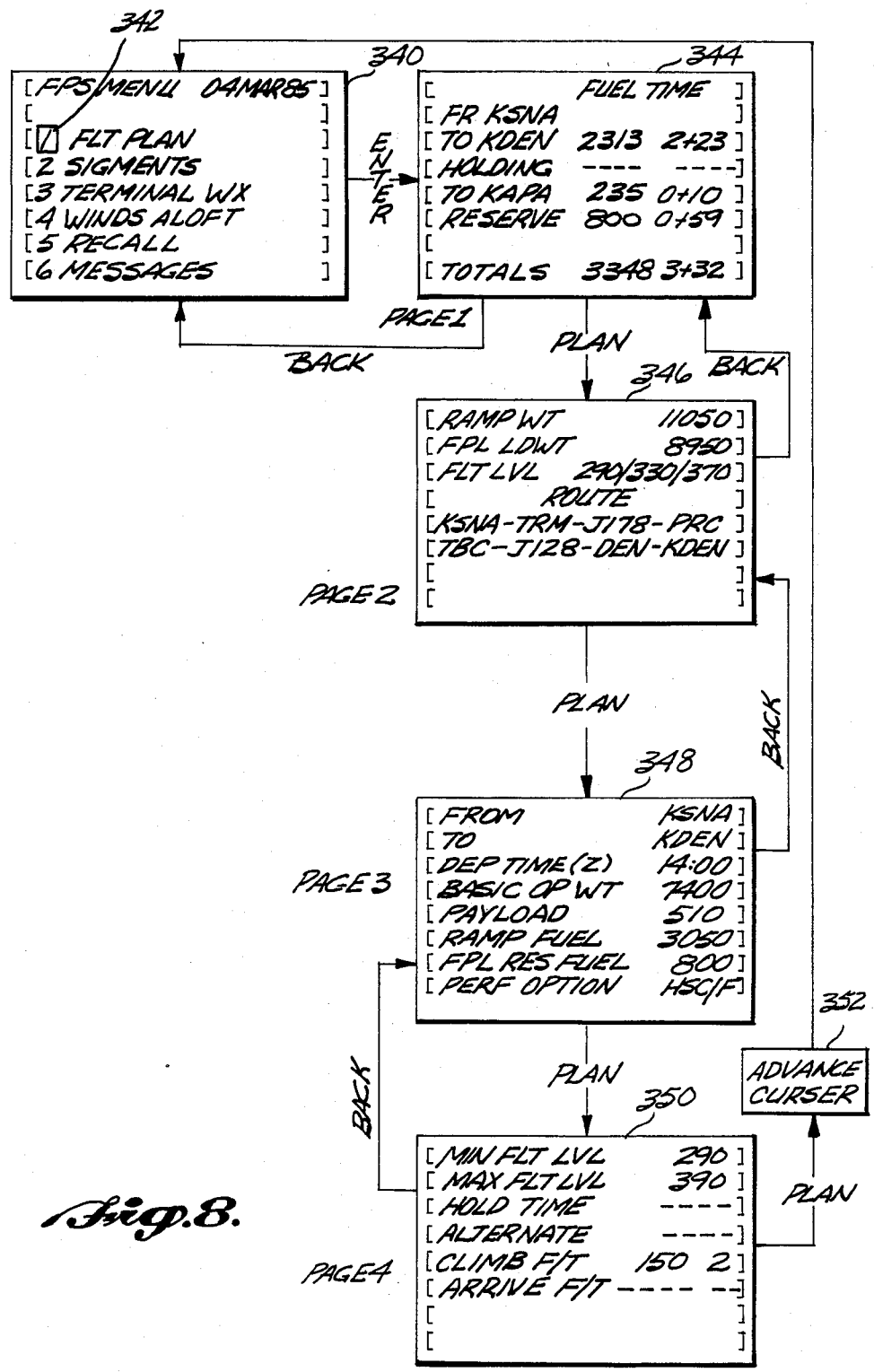
FIG. 8 depicts the operating sequence of the invention relative to reviewing a flight plan that is stored in the onboard components of the flight planning system.

FIG. 8 diagrammatically depicts the arrangement of the currently preferred realizations of the invention relative to provisions for reviewing a flight plan established by flight data center 30 and loaded into the aircraft system. As is indicated in FIG. 8, the flight planning system main menu ("FPS MENU"), which is indicated by the numeral 340, is used to initiate the flight plan review sequence. Specifically, in the currently preferred realizations being described, a cursor 342 is positioned over the numeral "1" of the legend "1 FLT PLAN" by operation of UP ARROW key 86 or DOWN ARROW key 88 of CDU 12. The ENTER key 90 is then operated, which causes CDU 12 to display the first page of flight plan information (344 in FIG. 8). With the first page 344 displayed on CRT 84 of CDU 12, activation of the PLAN key 96 of CDU 12 sequences data management unit 20 (FIG. 3) so that cathode ray tube 84 of CDU 12 displays the flight plan second page 346. Alternatively, activation of the BACK key 94 of CDU 12 causes processor unit 74 of the data management unit 20 to again display the main menu 342 on cathode ray tube 84.

When this sequence has been employed to display second page 346, operation of the PLAN key 96 of CDU 12 causes the display to advance to the third flight plan page 348. If instead the pilot activates the BACK key 94, the display reverts to the flight plan second page 346. As is further indicated in FIG. 8, when the PLAN key 96 of CDU 12 has been repeatedly activated to advance the display to the flight plan fourth page 350, activation of the BACK key causes reversion to the flight plan third page 348. As is indicated by block 352 of FIG. 8, activation of the PLAN key 96 of CDU 12 when cathode ray tube 84 displays the flight plan fourth page 350 causes the display of the main menu 340 with cursor 342 being advanced to the next selection item ("2 SIGMETS").

Although not indicated in FIG. 8, the currently preferred realizations of the embodiments being discussed modify flight plan first page 344 and flight plan second page 346 when flight plan data is displayed after a flight plan has been updated in the manner that will be described relative to FIG. 14. In particular, after a flight plan update, the "FR" (from) identifier on line 1 of flight plan first page 344 is changed to "UPDATE" the fuel and time data displayed change as a result of the updated information. On the flight plan second page 346, the ROUTE FROM identifier (KSNA in the flight plan second page 346 of FIG. 8) is changed to "UPDATE." Further, on the third flight plan page 348, the "FROM" identifier changes to "UPDATE," "DEP TIME" changes to "UPDATE TIME," "RAMP FUEL" changes to "UPDATE FUEL," "FPL RES FUEL" changes to "RESERVE FUEL" and the values in the respective display fields change to reflect the updated information.

Although not indicated in FIG. 8, the currently preferred embodiments of the invention modify flight plan second page 346 when the aircraft engines are started to begin a planned flight. In this regard when flight management computer 14 senses fuel flow, data management unit 20 causes the "RAMP WT" legend on flight plan second page 346 to change to "GROSS WT." While the engines are running, flight management computer 14 periodically calculates the weight of the fuel burned and causes the displayed GROSS WT value to decrease accordingly.

Figure 9:
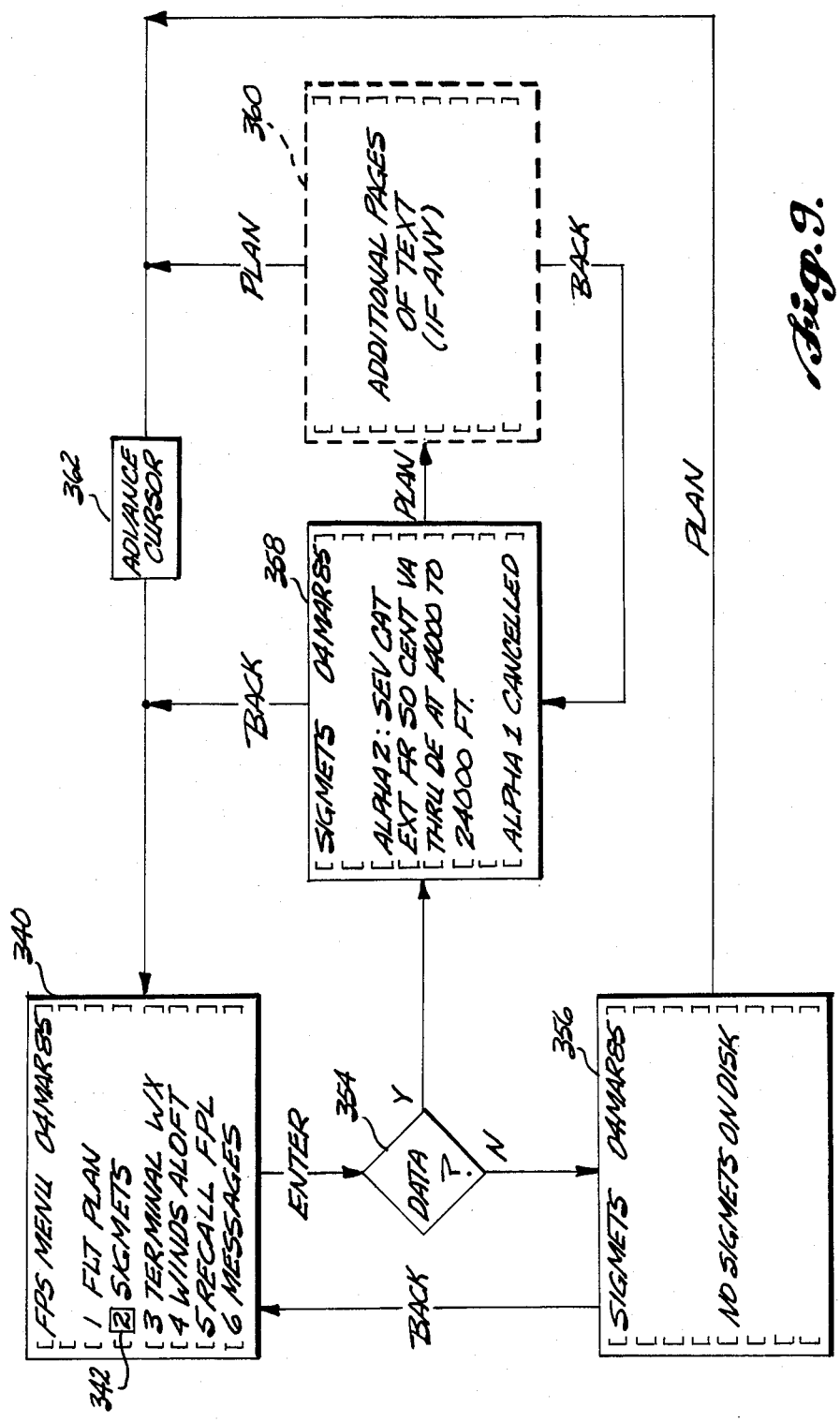
FIG. 9 depicts operation of the invention relative to display significant meteorological weather reports (SIGMENT's) that are pertinent to a flight plan established in accordance with the invention.

Referring now to FIG. 9, a review of the SIGMETS information that was transferred to the aircraft from a flight planning disk 54 can be reviewed by positioning the display cursor 352 over the identifying numeral "2" of the menu item "2 SIGMETS" and depressing ENTER key 90 of CDU 12. As is indicated by decisional block 354, if no SIGMETS data is present, cathode ray tube 84 displays the message "NO SIGMETS ON DISK" (as shown on SIGMETS display screen 356 of FIG. 9). If SIGMETS data was provided when the flight data center 30 of FIG. 1 provided weather and/or flight plan data, the SIGMETS message is displayed) as exemplified by SIGMETS display screen 358 of FIG. 9). If the available SIGMETS information cannot be displayed on a single display page (e.g., SIGMETS display screen 358), depressing the BACK key 94 of CDU 12 causes the main menu screen 340 to again be displayed. Alternatively, if additional SIGMETS information is available, pressing the PLAN key 96 of CDU 12 causes cathode ray tube 84 of CDU 12 to display additional pages of SIGMETS information. As also is indicated in FIG. 9, when the SIGMETS page being displayed by cathode ray tube 84 of CDU 12 is the "NO SIGMETS ON DISK" message or is the last page of SIGMETS information, pressing the PLAN key 96 causes display cursor 342 to advance (indicated at block 362) and reestablishes the main menu 340 with the display cursor 342 being positioned over the identifier "3" of the legend "TERMINAL WX" (terminal weather).

Figure 10:
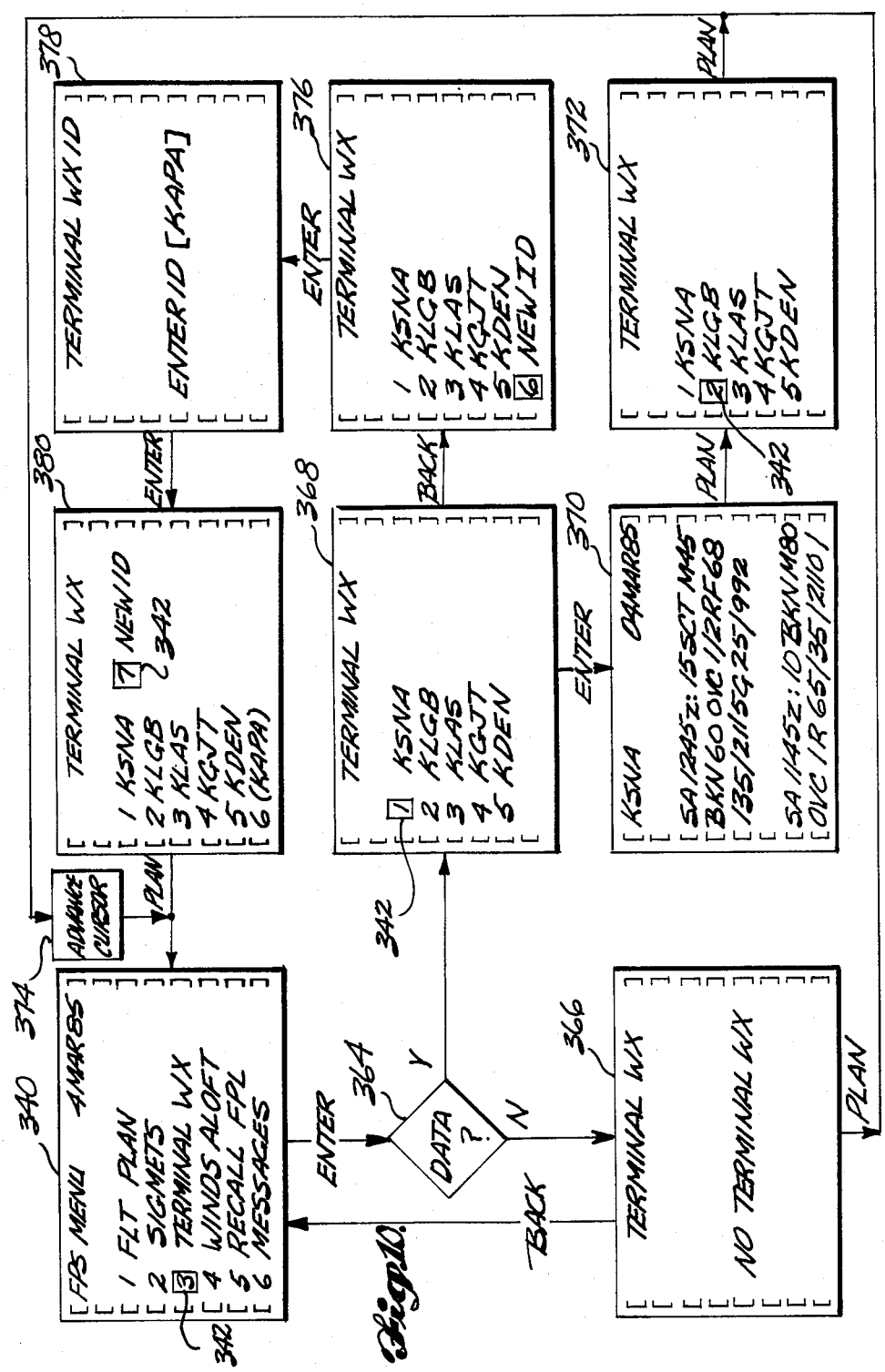
FIG. 10 illustrates operation of the invention to review observed and forecasted weather for selected navigation points geographic regions that are pertinent to a flight plan and to request that the ground based data center of FIG. 1 provide weather information for additional navigation points.

The terminal weather display sequence shown in FIG. 10 utilizes cathode ray tube 84 of CDU 12 to both display terminal weather information that was read from disk 54 when weather and flight plan information was loaded into the aircraft system and, further, permits the pilot to request that additional terminal weather data be supplied to the aircraft when the sequence to obtain a more recent flight plan for previously planned route is executed (FIG. 12) or when the sequence to obtain a flight plan update (FIG. 14) is executed. As can be seen in FIG. 10, the sequence for displaying terminal weather is initiated in the same manner as the operational sequences for flight plan review and SIGMETS display, e.g., by selecting the desired menu item with display cursor 342 and pressing the ENTER key 90 of CDU 12. The system then determines whether terminal weather information is available (decisional block 364) and, if not, displays the message "NO TERMINAL WX" on a terminal weather display screen 366. If terminal weather is available, a "TERMINAL WX" menu 368 is displayed. As is shown in the example TERMINAL WX menu 368 of FIG. 10, this menu lists standard identification codes for airports for which terminal weather information is available. A identification numeral precedes each terminal identifier.

To display terminal weather information for one of the listed terminals, the pilot positions the display cursor 342 over the numeral associated with that terminal and presses ENTER key 90 of CDU 12. As is indicated by the terminal weather display screen 370 of FIG. 9, cathode ray tube 84 of CDU 12 then displays the requested terminal weather. Although a single terminal weather display screen 370 is illustrated in FIG. 10, the terminal weather information normally includes surface observations, terminal forecasts, Notices to Airmen (NOTAMS) and pilot reports (PIREPS). Thus, two or more terminal weather display screens are typically required to display the available information. As was described relative to the display sequences depicted in FIGS. 8 and 9, when multiple pages are required, each subsequent page is accessed by pressing the PLAN key 96 of CDU 12 and prior pages can be reviewed by pressing the BACK key 94. As is indicated by display screen 372 FIG. 10, when the last page of terminal weather information is displayed and the PLAN key 96 is operated, CDU 12 displays the TERMINAL WX menu with the display cursor 342 being advanced to the next terminal identifier ("2 KLGB" in FIG. 10). If the PLAN key 96 is activated when the TERMINAL WX menu is displayed, the display cursor 342 is advanced (at block 374) and cathode ray tube 84 of CDU 12 displays the main screen 340 with cursor 342 positioned for selection of "4 WINDS ALOFT."

To initiate a request that the flight planning center 30 of FIG. 1 transmit to the aircraft terminal weather information for additional terminals, the pilot utilizes the above-discussed operational sequence of FIG. 10 to access the TERMINAL WX menu 368. The BACK key 94 of CDU 12 is then activated and the TERMINAL WX menu is modified in the manner shown by TERMINAL WX menu 376 of FIG. 10. In this modified menu, the display cursor 342 is positioned in the next available field for display of a terminal identifier and the next available terminal identification number is displayed with the legend "NEW ID." If a request for additional terminal weather is to be transmitted to data center 30 of FIG. 1 during the next sequence for recalling an existing flight plan (FIG. 12) or the next sequence for obtaining a flight plan update (FIG. 14), the pilot operates the ENTER key 90 of CDU 12. The system responds by displaying the "TERMINAL WX ID" screen 378 of FIG. 10. The identification code for the terminal for which weather is to be requested is then keyed into the field adjacent the legend "ENTER ID." When the desired entry has been made, the ENTER key 90 of CDU 12 is pressed. As is shown by TERMINAL WX menu 380 of FIG. 10, the request is now displayed as a menu item ("6 (KAPA)") in terminal weather menu 380 of FIG. 10. In this display, the parenthesis surrounding the terminal identifier indicate that no weather information for that location is currently stored in system memory. In addition to displaying the identifier for the requested weather, the display cursor 342 is advanced to the next available terminal identification number ("7" in FIG. 10) and displays the legend "NEW ID." If additional weather requests are to be made, the pilot repeats the operation described relative to terminal weather identification screen 378. When no additional terminal weather information is desired, the PLAN key 96 of CDU 12 is activated to return to the main menu display 340 with the display cursor 342 being advanced to the "4 WINDS ALOFT" menu item.

Figure 11:
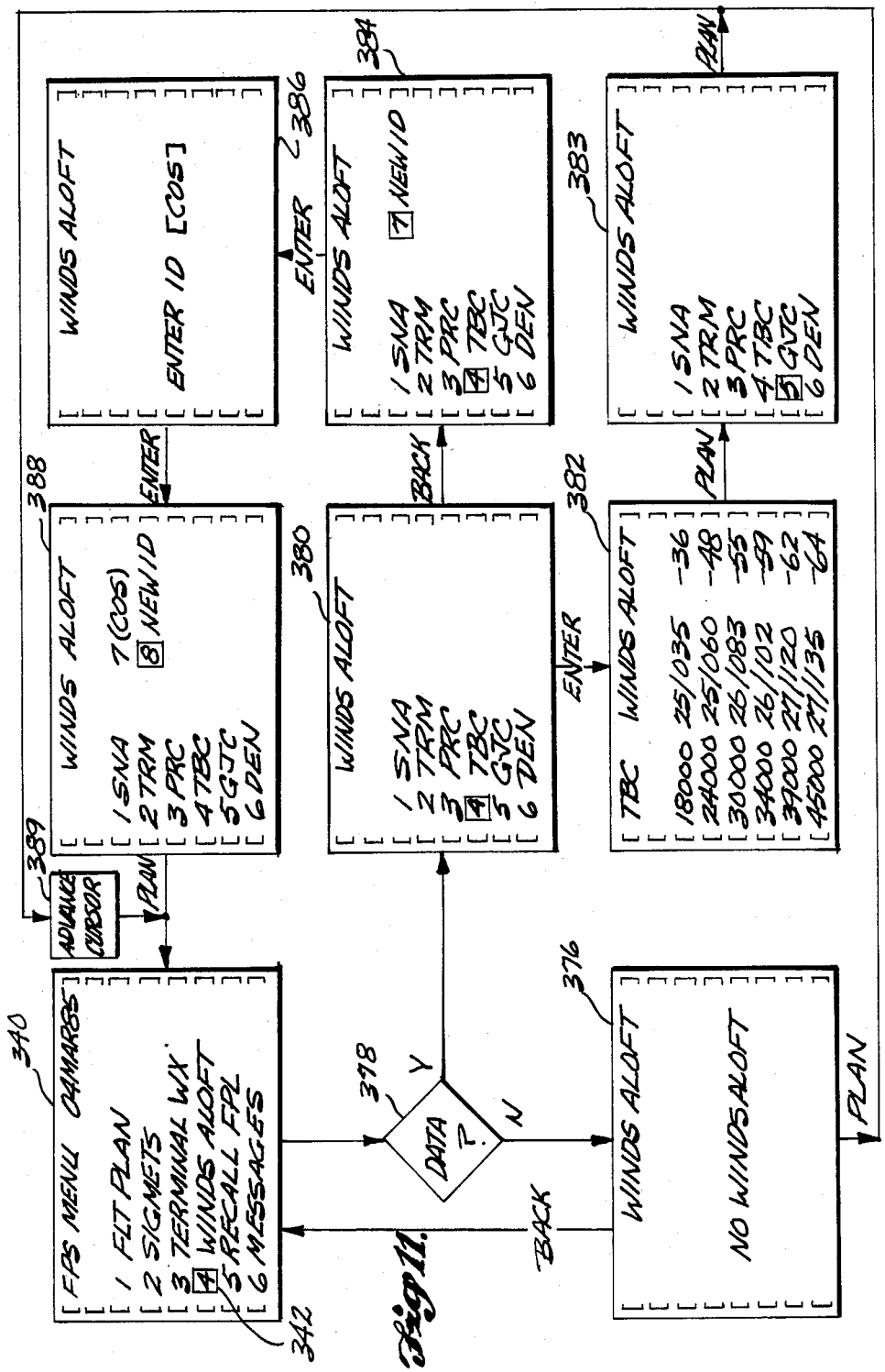
FIG. 11 illustrates operation of the invention to review wind conditions at various altitudes for selected navigation points that are relevant to a flight plan and to request that the ground based data center of FIG. 1 provide wind condition information for additional navigation points.

As can be seen from FIG. 11, the pilot can operate the keys of CDU 12 to display and request an update in "WINDS ALOFT" data (wind information) in the manner described relative to displaying and updating terminal weather information. In the sequence diagram shown in FIG. 11, a "WINDS ALOFT" display screen 376 displays a message "NO WINDS ALOFT" when the flight management computer 14 and the data management unit 20 of FIG. 1 determine that no wind information is available (indicated by decisional block 378 of FIG. 11). In the depicted arrangement the depicted "WINDS ALOFT" menu 380 is similar to the "TERMINAL WX" menu 368 of FIG. 10, listing the identification codes for ground locations and allowing the pilot to display a "WINDS ALOFT" display screen 392. As is shown in FIG. 11, the "WINDS ALOFT" display screen 382 lists the forecasted wind direction/wind speed and also lists the forecasted outside air temperature for several altitudes at the selected navigation point. As also is indicated in FIG. 11 by the illustrated display screens 384, 386 and 388, a sequence identical to the sequence employed in the terminal weather diagram of FIG. 10 is utilized to enter a request that additional WINDS ALOFT information be provided by the flight data center 30 of FIG. 1 when either the flight plan update sequence of FIG. 14 or the sequence for recalling an existing flight plan (FIG. 12) is executed.

In addition to the above-discussed provisions for reviewing flight plan and weather information, the flight planning system main menu (340 in FIGS. 8–11) allows the pilot to initiate a request that flight data center 30 of FIG. 1 recall a flight plan, i.e., reissue a previously established flight plan.

Figure 12:
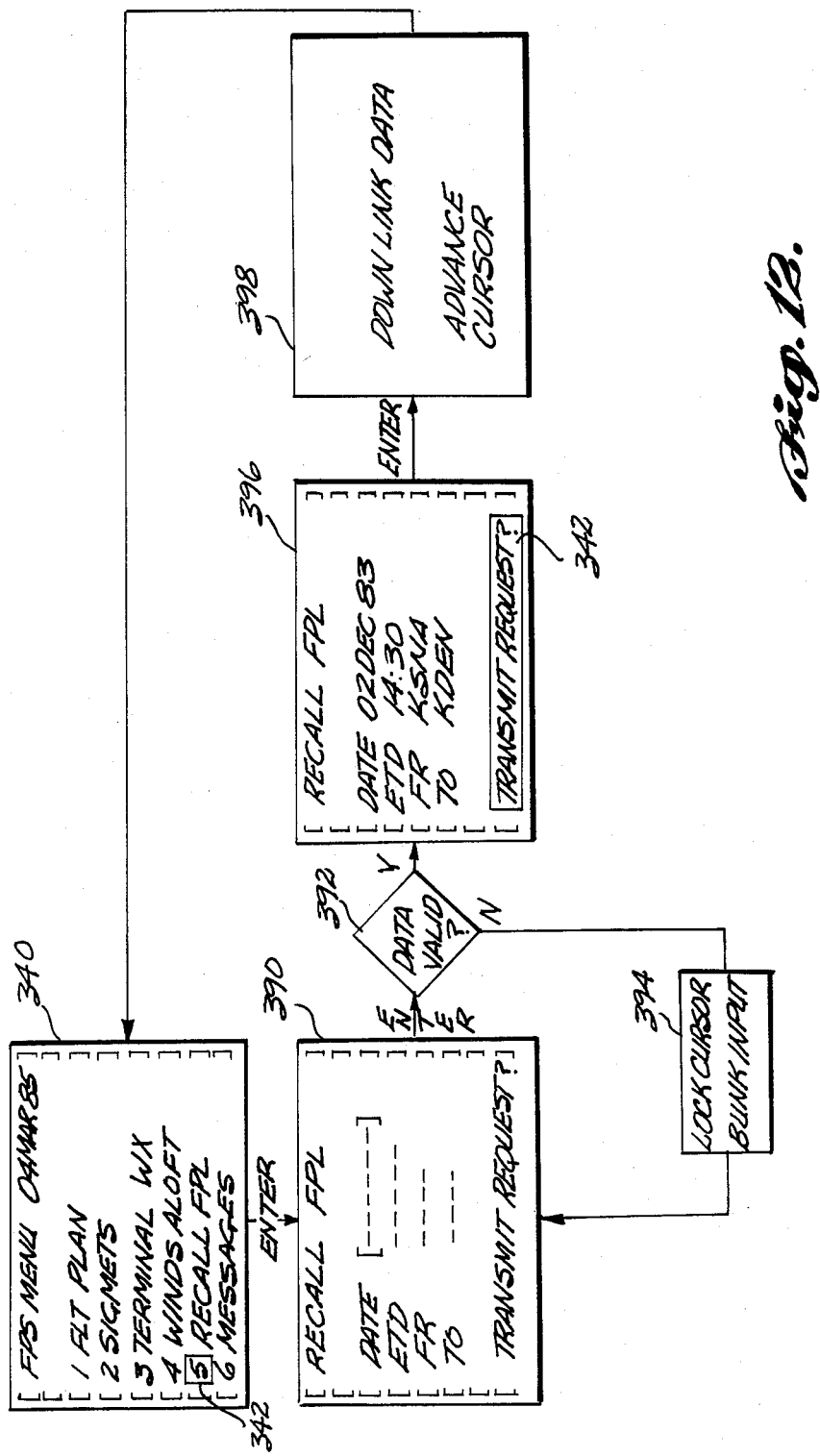
FIG. 12 illustrates an operational sequence that is employed in the invention for an enroute request that more recent flight data be provided for a flight plan that previously was loaded into the aircraft.
Figure 13:
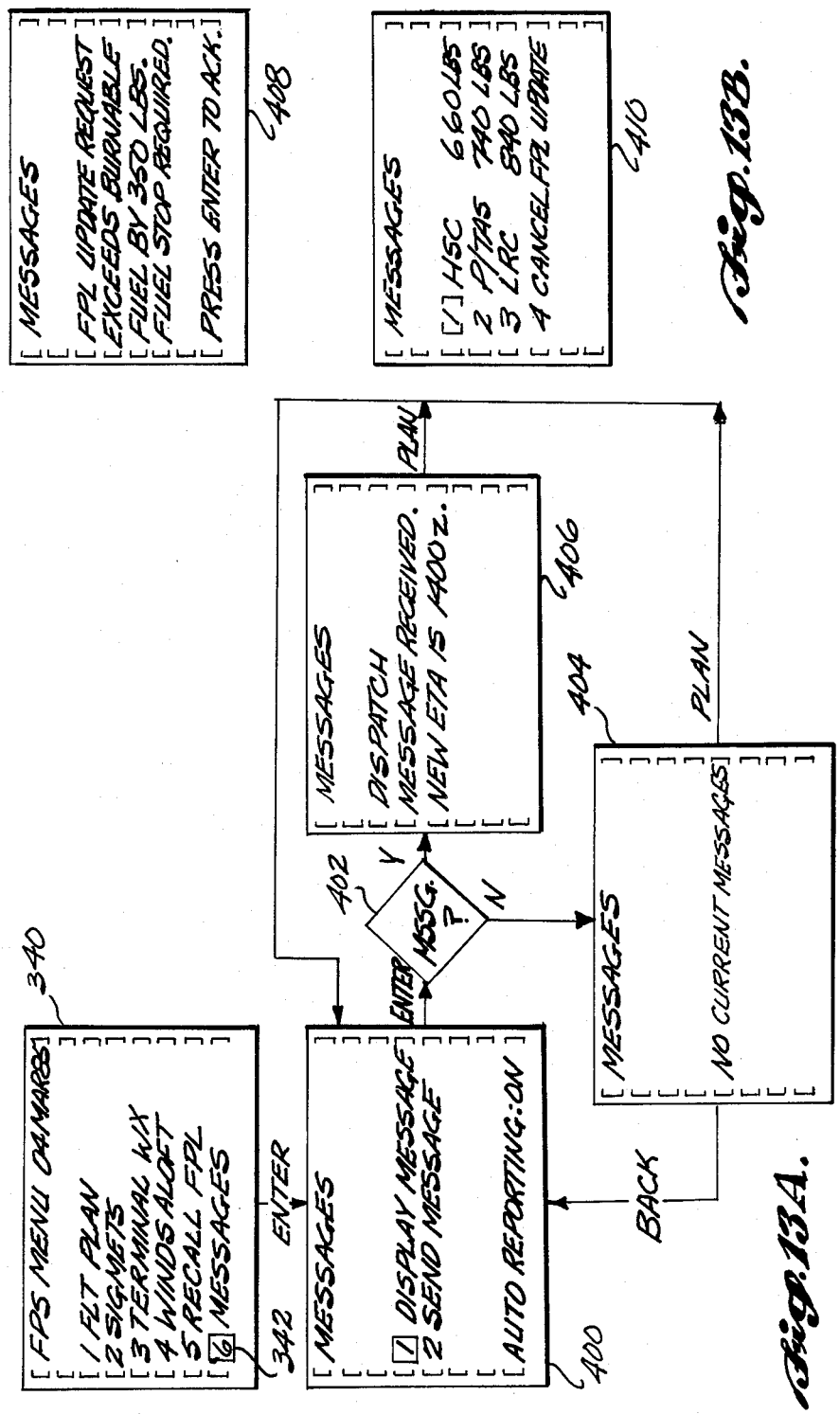
FIGS. 13A and 13B illustrate operational sequences for reviewing messages that have been transmitted to the aircraft.

As is illustrated in FIG. 12, to initiate such a request, the pilot accesses the flight planning system main menu 340 and positions the display cursor 342 over the numeral "5" of the "5 RECALL FPL" menu item. When the ENTER key 90 of CDU 12 is operated, the cathode ray tube 84 of CDU 12 displays the "RECALL FPL" screen 390 of FIG. 12. The keys of CDU 12 are then operated to enter a date in an entry field that is identified by a "DATE" legend. When the date has been entered, the ENTER key 90 of CDU 12 is activated. As is indicated by decisional block 392 and block 394 of FIG. 12, if the date is not a valid day, month, year entry, display cursor 342 is caused to blink and will not advance until a valid date is entered. After successful entry of a date, the pilot operates the keys of CDU 12 to enter the estimated time of departure, the departure airport and the destination airport (identified by the legends "ETD," "FR" and "TO" on RECALL FPL display screen 390. As the pilot enters data for each of these entry items and operates the ENTER key 90 of CDU 12 the entered data is checked for validity. In particular, the time entry is checked to ensure that a valid hours and minutes designation has been entered and the origin and destination airports are checked to ensure that either a three- or four-character entry has been made.

When it is determined that all entries are valid, cathode ray tube 84 of CDU 12 positions the display cursor 342 over a prompt "TRANSMIT REQUEST?" that is located on the bottom line of the RECALL FPL display screen (shown at 396 in FIG. 12). After confirming that the displayed information corresponds to the desired flight plan, the pilot operates the ENTER key 90 of CDU 12. As is indicated at block 398, this causes the entered data to be transmitted to the flight data center 30 of FIG. 1 and causes the main menu screen 340 to be displayed on cathode ray tube 88 of CDU 12 with the cursor advanced to the next menu item ("6 MESSAGES").

As was described relative to FIGS. 1 through 3, VHF receiver-transmitter unit 80 of data management unit 20 provides the airborne portion of the radio link for transmission of data such as the above-discussed request that an existing flight plan be reissued. It will be recognized by those skilled in the art that during the above-discussed RECALL FPL sequence (and the various other operational sequences discussed herein), flight management computer 14 and processor unit 74 of data management unit 20 are in data communication with CDU 12 and are programmed by conventional programming techniques to perform the necessary data formatting and signal processing. In addition, it can be recognized that, when flight data center 30 of FIG. 1 reissues and transmits an existing flight plan and associated weather information that was originally requested by operation of the portable computer 40 in the manner described relative to FIG. 5B, the data sent to aircraft 10 is transmitted by ground based VHF transmitter-receiver 36 of FIG. 1 and is received by VHF receiver-transmitter unit 80 of data management unit 20. The data is then formatted for display and stored in the memory of data management unit 20 and/or flight management computer 14.

As was described relative to FIGS. 1 through 3, VHF receiver-transmitter 80 of data management unit 20 allows the aircraft 10 to receive and send messages while the aircraft is airborne. As is indicated in FIG. 13A, initiation of system operation in the "MESSAGES" mode is initiated by positioning display cursor 342 over the numeral "6 MESSAGES" on the main menu 340. When the ENTER key 90 of CDU 12 is operated, a MESSAGES menu 400 is displayed, which lists the options "1 DISPLAY MESSAGE" and "2 SEND MESSAGE." To display messages received from data center 30 of FIG. 1, display cursor 342 is positioned over the numeral "1" by using the UP ARROW and DOWN ARROW keys (86 and 88 of CDU 12) and the ENTER key 90 is activated. As is indicated by decisional block 402 and MESSAGES display screen 404 of FIG. 13A, if a message has not been received, the MESSAGES display screen indicates "NO CURRENT MESSAGES." On the other hand, as is shown by MESSAGES display screen 406, if a message has been received and stored within the system memory, processor unit 74 of data management unit 20 causes the message to be displayed on cathode ray tube 84 of CDU 12. As also is indicated in FIG. 13A, when it is observed that no messages have been received or the received messages are noted, operation of the PLAN key 96 of CDU 12 causes the system to display the messages menu 400 with the cursor advanced to option to "SEND MESSAGE".

As is indicated by MESSAGES display screen 406 of FIG. 13A and MESSAGES display screens 408 and 410 of FIG. 13B, two types of messages are received by the system. Firstly, messages of a purely advisory nature such as a messsage indicated on MESSAGES display screen 406 of FIG. 13A can be sent to the aircraft to provide information to the crew-members. Such messages often are communications between the aircraft crew and ground personnel that are employed by the operator of the aircraft. Secondly, as is indicated by MESSAGES display screens 408 and 410 of FIG. 13B, messages which require action by the flight crew can be sent to the aircraft from the flight data center 30 of FIG. 1. The message shown in MESSAGES display screen 408 of FIG. 13B is an example of the type of message that can be sent to the aircraft if a flight plan update that is requested during the sequence to be described relative to FIG. 14 cannot be established. In the particular situation illustrated by MESSAGES display screen 408, the flight plan update requested by the pilot cannot be established because the computers of the flight data center 30 of FIG. 1 estimate that the requested flight plan requires more fuel than that which remains onboard the aircraft. MESSAGES display screen 410 of FIG. 13B provides a second example of the type of message that can be sent to the aircraft by the flight data center 30 when the pilot has requested an updated flight plan. In the situation shown in MESSAGES display screen 410, an updated flight plan can be provided only if the pilot will accept a fuel reserve that is less than that specified when the original flight plan was established. In the situation illustrated by MESSAGES display screen 410, four options are given to the pilot. The first option ("1 HSC 660 LBS") is to elect a high speed cruise mode, which will result in an estimated fuel reserve of 660 pounds. The second option ("2 P/TAS 740 LBS") is to elect to execute a flight plan at the previously mentioned preferred true air speed and accept an estimated fuel reserve of 740 pounds. The third option (3 LRC 840 LBS") is to elect a long range cruise cruise mode, in which case the estimated fuel reserve will be 840 pounds. The fourth option ("CANCEL FPL UPDATE") is to forego a flight plan update (e.g., make a fuel stop). When this type of message is received, the pilot utilizes the keys of CDU 12 to select one of the options and the response is transmitted to flight data center 30 (via data management unit 20) for appropriate action. For example, in the situation being discussed, selection of "2 P/TAS 740 LBS" will cause flight data center 30 to transmit to the aircraft a flight plan update that is to be flown at preferred true airspeed.

In addition to displaying messages that are transmitted from the flight data center 30 or the communication center 34 of FIG. 1, the currently preferred embodiments of the invention also display advisory messages that are generated by flight management computer 14 or data management unit 20 of FIG. 1. For example, if during the previously discussed sequence of FIG. 12, the VHF receiver-transmitter unit 80 of data management unit 20 (FIG. 3) is inoperable, processor unit 74 of data management unit 20 will cause CDU 12 to display a message indicating that the VHF unit is disabled.

As was described relative to FIGS. 1 through 4, a major aspect of the flight planning system of this invention is the provision for enroute flight plan amendment and weather information updating. As is shown in FIG. 14, in the currently preferred realizations of the more fully integrated embodiments of the invention, the flight plan update sequence can be initiated when the CDU 12 displays the previously discussed active flight plan page (shown as display screen 420 in FIG. 14). Using the DOWN ARROW key 88 of CDU 12, the pilot moves the display cursor 342 downwardly until the system displays an active flight plan screen of the type identified as display screen 422 in FIG. 14. As is indicated in FIG. 14, the bottom portion of display screen 422 includes a prompt "FPL UPDATE?". If additional waypoints are to be added to the updated flight plan, the standard identification codes for those waypoints are added in the manner that is prescribed by the aircraft flight management or navigation system. Such additional waypoints will be required, for example, if the air traffic control authority has instructed the flight crew to follow a different route.

Once the route displayed on the active flight plan display screen corresponds to the desired or necessary route, the UP ARROW key 86 or DOWN ARROW key 88 of CDU 12 are utilized to position the display cursor 342 over the prompt "FPL UPDATE?". When the ENTER key 90 of CDU 12 is operated, cathode ray tube 84 of CDU 12 displays the "FPL UPDATE" screen 424 of FIG. 14. In situations in which the aircraft is equipped with an onboard air data computer, the digital altitude signal supplied by the onboard air data computer is used to generate an indication of the current altitude of the aircraft ("ACTUAL FL") on FPL UPDATE screen 424 of FIG. 14. If the aircraft is not equipped with an onboard air data computer, the ACTUAL FL field is blank and the pilot keys in the actual flight level of the aircraft using the keys of CDU 12. When the proper flight level is displayed, the ENTER key 90 of CDU 12 is operated. As is indicated by blocks 426 and 428 of FIG. 14, the flight level is checked to verify that a reasonable value has been entered. In this regard, in the currently preferred realizations of the invention, the flight level entry must be above FL 290, must be an odd number and must be less than the aircraft maximum flight level. In these embodiments of the invention, the maximum flight level for the aircraft is stored in a read only memory unit that is carried onboard the aircraft (or is provided by other conventional means). If the flight level value that is entered is acceptable, the display cursor 342 is advanced to the entry field for "ASSIGNED FL", which, based on signals provided by the data management unit 20, displays the final cruise flight level for the existing flight plan. If a flight level change has been dictated by the air traffic control authority or if such a change is desired, the pilot operates the keys of CDU 12 to insert an amended flight level and presses the ENTER key 90 of CDU 12. In the currently preferred realizations of the invention, the value entered for ASSIGNED FL is validated in the same manner as the previously discussed value for ACTUAL FL.

If the ACTUAL ASSIGNED FL displayed on display screen 424 is proper, display cursor 342 advances to the PAYLOAD field. In the currently preferred realizations of the invention, data management unit 20 of FIG. 3 causes a displayed payload value that corresponds to the payload specified when the existing flight plan was established. If it is necessary to amend the payload value, the keys of CDU 12 are operated to insert the proper value. When the proper value is displayed, the ENTER key 90 of CDU 12 is activated. In the currently preferred realizations of the invention, the payload entry is checked in the manner described relative to establishing the original flight plan.

If the payload entry is acceptable, display cursor 342 advances to the "FUEL REM" (fuel remaining) field. In the currently preferred embodiments of the invention, the data management unit 20 of FIG. 3 supplies a remaining fuel value transferred to it by the flight management computer 14. The pilot compares the FUEL REM value displayed to the value displayed by the aircraft fuel gauges and, if necessary, amends the FUEL REM entry. In the currently preferred embodiments of the invention, the value entered is verified in the manner described previously herein. If the entry is acceptable, display cursor 342 is advanced to the CRUISE MODE field.

In the currently preferred realizations of the invention, the data management unit 20 supplies a CRUISE MODE value that corresponds to the cruise mode for the flight plan being updated. If the pilot desires a different cruise mode, the keys of CDU 12 are operated to enter the desired cruise mode. When it is verified that the entered cruise mode is a valid mode for the aircraft (by comparing the entered mode with a list stored in system memory) the ENTER key 90 of CDU 12 is operated and the display cursor 342 is positioned over the TRANSMIT REQUEST? prompt (illustrated in FPL UPDATE screen 430 of FIG. 14). The ENTER key 90 of CDU 12 is then operated when the pilot wishes to transmit a request for a flight plan update to the flight data center 30 of FIG. 1. As is indicated in FIG. 14, operation of the ENTER key 90 causes data transmission that is formatted by processor 74 of data management unit 20 transmitted and sent by VHF receiver-transmitter unit 80 of the flight management unit 20. As is also indicated in FIG. 14, when the update request is transmitted, the original active flight plan screen 420 is displayed by cathode ray tube 84 of CDU 12.

In addition to the five flight plan input values entered during the above described sequence, the data management unit 20 transmits various other data that is required by the flight data center 30 in order to establish the updated flight plan. This data includes the current latitude and longitude of the aircraft and the latitude and longitude of all requested way points (provided to the data management unit 20 by flight management computer 14); the aircraft type and registration number (which is stored in a read only memory carried by the aircraft or provided by other conventional means); the flight plan number of the flight plan being updated; and any requests for weather updates that have been entered by means of the operational sequences described relative to FIGS. 10 and 11.

Figure 14:
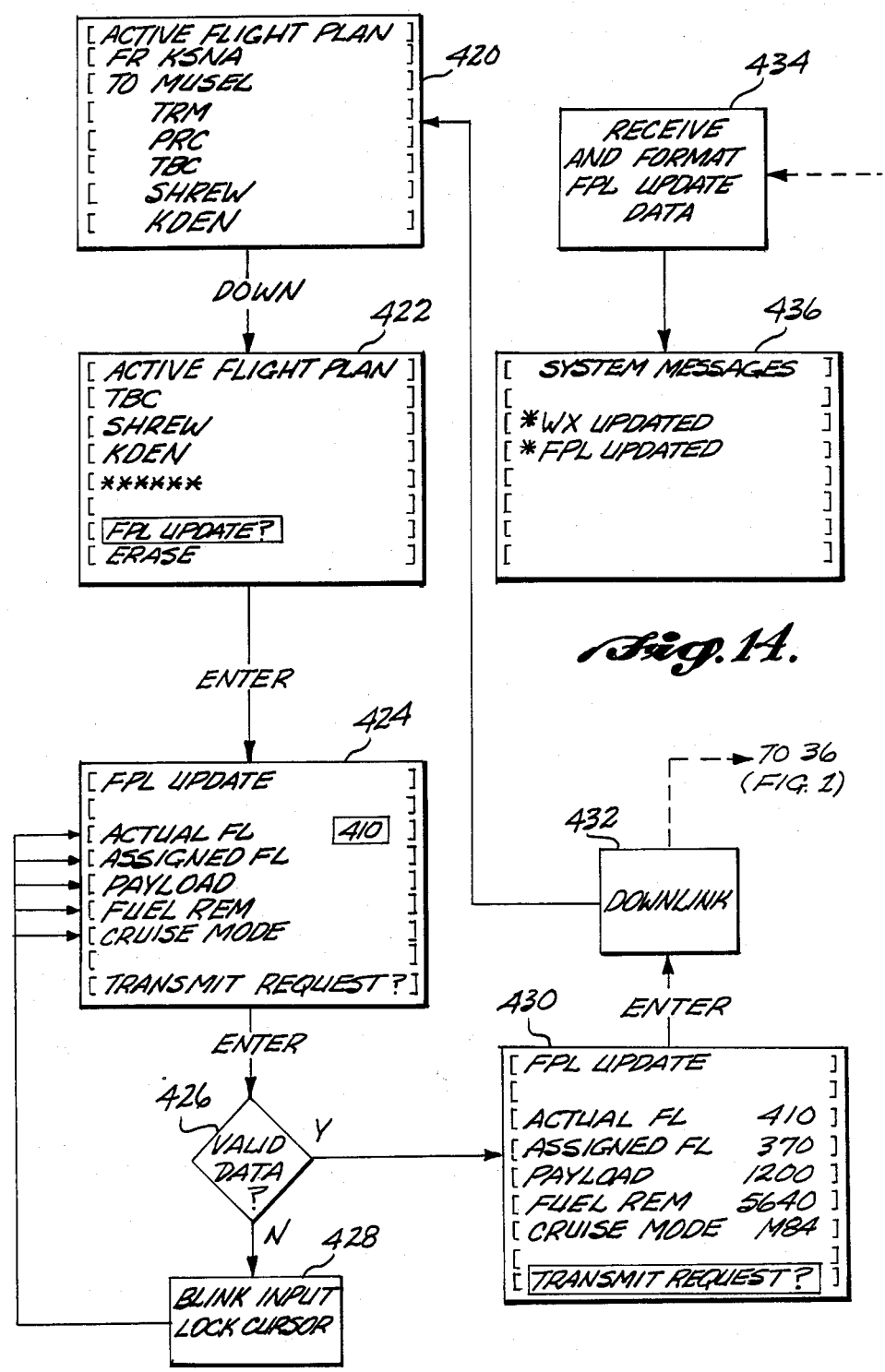
FIG. 14 illustrates an operational sequence for enroute modification of a flight plan that previously has been loaded into the aircraft system.

As also is indicated in FIG. 14, when the flight data center 20 transmits an updated flight plan and/or weather information to the aircraft, the data is received by VHF receiver-transmitter 80 of the data transfer unit 14 and is processed and formatted by processor unit 74 of the data management 20 (indicated at block 434 of FIG. 14). As is indicated by the SYSTEM MESSAGES screen 436 of FIG. 14, data management unit 20 informs the flight crew that the requested weather and/or flight plan update has been received. The updated flight plan and/or weather data can then be reviewed and adopted as the active flight plan for flight management computer 14 in the manner previously described herein. If the flight data center 30 could not establish the requested flight plan update, the SYSTEM MESSAGES screen 436 will display "SEE MESSAGE" instead of displaying "FPL UPDATED". As described relative to FIGS. 13A and 13B, in such a situation, the sequence for displaying messages can be utilized to determine why the requested update cannot be made and, if possible, what compromises can be made in order to obtain an amended flight plan.

In view of the foregoing description of the invention it will be recognized that the disclosed embodiments can be changed and modified in various ways without departing from the scope and the spirit of the invention. For example, since the data management unit 20 and the flight management computer 14 both include signal processors, the signal processing sequences described herein can be allocated to the flight management computer 14 and the data management unit 20 in different ways. In this regard, although the currently preferred embodiments of the invention provide an optional flight planning system for use with existing flight management and navigation systems, the invention can be totally integrated and housed within the enclosures of the flight management system. Similarly, although the currently preferred embodiments of the invention are arranged to use the control and display unit of the aircraft flight management or navigation system (CDU 12 in FIGS. 1 and 4), a separate flight planning control and display unit can be employed, if desired.

The embodiments of the invention in which an exclusive property or privilege is claimed are defined as follows:

1. A flight planning system for use with an aircraft having a computerized navigation system comprising:
   a data center at a first site that is remotely located from said aircraft includes a database storing navigation route information, performance characteristics for the aircraft and weather data, along with processing means responsive to flight plan input information for generating flight plans from said database, said processor of said data center being accessible by means of a data communications link for transmitting said flight plan input information to said data center from a second site remote from both said aircraft and said data center and for transmitting said flight plans to said second remote site;
   a portable computer for use at a location remote from said aircraft, said portable computer having a processor, a memory, data input means for pemitting an operator to input flight planning data, display means for displaying data to an operator and data recording means for recording one or more flight plans on a storage medium;
   data communications means for selectively establishing a data communication link between said portable computer and said data center;
   a data transfer unit secured within the aircraft including means for receiving and reading said storage medium and reading said one or more flight plans recorded on said storage medium; and
   a data management unit connected to said data transfer unit and the computerized navigation system; said data management unit including means for transferring said one or more flight plans from said data transfer unit to said computerized navigation system.

2. The flight planning system of claim 1 wherein said portable computer includes means permitting the operator to input requests for weather data and means for recording weather data on said storage medium.

3. The flight planning system of claim 1 further comprising:
   a ground based radio communication system operatively connected to said data center;
   a radio transmission unit located within said aircraft for two-way communication with said ground based radio communication system;
   said data management unit including update means for transmitting requests for flight plan updates to said data center via said radio transmission unit and said ground based radio communications system and for transmitting revised flight plans via said radio communication system to said aircraft.

4. The flight planning system of claim 3 wherein said update means includes means for transmitting requests for weather updates to said data center and means for receiving updated weather information transmitted to said aircraft from said ground based radio communications system.

5. The flight planning system of claim 3 wherein said data management unit includes a processor unit operatively connected to the computerized navigation system and a modem operatively connected between said radio transmission unit and said processor unit.

6. The flight planning system of claim 1 wherein said storage medium is a magnetic disk.

7. The flight planning system of claim 6 wherein said data transfer unit includes a disk drive for receiving said magnetic disk and includes control means for controlling said disk drive.

8. The flight planning system of claim 7 wherein said control means includes memory for storing said flight plan.

9. The flight planning system of claim 1 additionally including progress reporting means for displaying actual flight data on the computerized navigation system in comparison with said flight plan.

10. The flight planning system of claim 1 wherein said data input means is operable for storing flight plan input information for transmission to said data center prior to the time at which said data communications link is established by said data communications means.

11. The flight planning system of claim 10 wherein said flight plan input information is stored in memory of said portable computer and includes, aircraft identification data, aircraft weight data, departure airport, destination airport and fuel data.

12. The flight planning system of claim 11 wherein said flight plan input information is processed by said processor and formatted for display on said display means of said portable computer prior to establishment of said data communications link between said portable computer and said data center.

13. The flight planning system of claim 12 wherein said portable computer includes a modem and said flight plan input information is transmitted through said modem from said memory to said data center after establishment of said data communications link between said portable computer and said data center and wherein said data center includes validation means for checking the reasonableness of said flight plan input data.

14. The flight planning system of claim 13 wherein said validation means transmits any unreasonable flight plan input informaton back to said portable computer for display on said display unit.

15. The flight planning system of claim 13 wherein said data center transmits to said portable computer for display on said display unit weather data selected in response to said weather request input information.

16. The flight planning system of claim 13 wherein said data center in response to said flight plan input information supplied by said portable computer generates a first set of at least three optimized flight plans for different cruise mode and transmits said first set of flight plans to said portable computer for display on said display unit.

17. The flight planning system of claim 16 wherein said data input means includes selection means for operator selection of one of said first set of optimized flight plans and means for transmitting a signal representative of said selection to said data center via said data communications link.

18. The flight planning system of claim 17 wherein said data center includes means responsive to said signal representative of said selection for generating a second set of optimized flight plans and for transmitting said second set of optimized flight plans to said portable computer via said data communications link for display on said display unit.

19. The flight planning system of claim 18 wherein said selection means is operable for selection of one of said second set of optimized flight plans.

20. The flight planning system of claim 19 wherein said processor of said portable computer includes means for storing said selected one of said second set of flight plans on said storage medium.

21. The flight planning system of claim 20 wherein said portable computer processor and memory are operatively interconnected for display of said selected one of said second set of said flight plans when said data communications link no longer establishes a data communications link between said portable computer and said data center.

22. The flight planning system of claim 21 wherein said different cruise modes include a pilot-preferred true airspeed; high speed cruise for said aircraft and long range cruise for said aircraft and wherein said second set of optimized flight plans include flight plans for different flight levels.

23. A flight planning system for use with an aircraft having a computerized navigation system comprising:
 a data center located on the ground that includes a database storage navigation route information, performance characteristics for the aircraft and weather data, along with processing means for generating flight plans from said database;
 a ground base radio communication system connected to said data center; and
 a data management unit secured within the aircraft and operatively connected to the computerized navigation system, said data management unit including a radio transmission unit for communicating with said data center via said ground based radio communication system, said data management unit including processor means operatively connected to said radio transmission unit for transmitting requests for flight plan updates to said data center via said ground based radio communication system and for receiving flight plan transmitted to said aircraft via said ground based communication system.

24. The flight planning system of claim 23 wherein said processor means is operatively interconnected to said radio transmission unit for transmitting requests for weather information to said data center via said ground based radio communications system and for receiving updated weather information transmitted to said aircraft via said ground based radio communication system.

25. The flight planning system of claim 23 further comprising progress reporting means for displaying current aircraft flight data with corresponding flight plan data.

26. A method of providing a flight plan for an aircraft navigation system comprising the steps of:
 (a) tramsmitting a signal representative of required flight plan input information to a computer based data center having a data base that includes at least weather and navigation data;
 (b) generating within said computer based data center a proposed flight plan that is based on said signal representative of said required flight plan input information and weather and navigation data that is included in said data base;
 (c) transmitting from said computer based data center to the source of said signal representative of said required flight plan input information a proposed flight plan;

(d) recording on a recording medium signals representative of said proposed flight plan received from said computer based data center;

(e) transporting the recording medium that contains said data representative of said proposed flight plan to an aircraft that is equipped with said aircraft navigation system; and (g) generating at said aircraft a flight plan signal from said recording medium that includes said data representative of said proposed flight plan.

27. The method of claim 26 wherein said step of trasmitting a signal representative of required flight plan input information includes the steps of:

(a) recording on said recording medium data representative of said signal representative of said required flight plan input information;

(b) subsequently establishing a data communication link between said computer based data center and means for reading said data recorded on said recording medium;

(c) generating a signal representative of said data recorded on said recording medium; and (d) transmitting said signal representative of said data recorded on said recording medium to said computer based data center.

28. The method of claim 26 wherein said flight plan is being executed by said aircraft and wherein said method further comprises the steps of:

(a) displaying for review a set of flight plan data items that indicate predicted values of said flight data items, said predicted values of said flight data items being based on said flight plan; and (b) displaying for review and comparison with said displayed flight data items corresponding values that are based on the actual flight status of said aircraft.

29. The method of claim 26 wherein the step (a) of transmitting a signal representative of required flight plan input information is effected at a first location and said step (b) of generating said proposed flight plan is effected at a second location that is remote from said first location.

30. The method of claim 26 further comprising the steps of:

(a) transmitting a digitally encoded signal representative of one or more navigation points to said computer based data center;

(b) generating within said computer based data center a digitally encoded signal that is representative of weather conditions at said one or more navigation points; and (c) transmitting from said computer based data center to the source of said digitally encoded signal representative of navigation points a digitally encoded signal representative of weather weather conditions at said one or more navigation points.

31. The method of claim 30 further comprising the step of recording data on said recording medium that is representative of said weather conditions at said one or more navigation points.

32. The method of claim 26 wherein said data base of said computer based data center includes aircraft performance characteristics of a plurality of aircraft; said step (a) of transmitting a signal representative of required flight plan information includes the step of identifying a particular aircraft included within said plurality of aircraft; and said step (b) of generating within said computer based data center a proposed flight plan includes generating said proposed flight plan in accordance with the performance characteristics of said particular aircraft.

33. The method of claim 26 wherein said aircraft navigation system is a computer based navigation system, said step (a) of transmitting said signal representative of said required flight plan input information includes the step of digitally encoding the transmitted signal and is performed using a portable computer, and wherein said step (b) of generating a flight plan signal from said recording medium includes the step of digitally encoding the generated flight plan signal and wherein said method further comprises the step of transmitting said digitally encoded flight plan signal to said computer based navigation system.

34. The method of claim 33 wherein said proposed flight plan is a first set of flight plans and said step of transmitting a digitally encoded signal representative of said proposed flight plan includes transmitting a digitally encoded signal representative of each flight plan of said first set of flight plans.

35. The method of claim 34 further comprising the steps of:

(a) generating a display that can be read by the operator controlling the method to ascertain the characteristics of each flight plan of said first set of flight plans;

(b) selecting a particular flight plan from said first set of flight plans;

(c) generating a digitally encoded signal representative of the selected flight plan of said first set of flight plans;

(d) transmitting to said computer based data center said digitally encoded signal representative of said selected flight plan of said first set of flight plans.

36. The method of claim 35 further comprising the steps of:

(a) generating within said computer based data center a second set of flight plans that is based on said signal representative of said selected flight plan of said first set of flight plans;

(b) transmitting from computer based data center to said source of said signal representative of said selected flight plan a digitally encoded signal representative of said second set of flight plans; and (c) recording on said recording medium signals representative of at least one flight plan of said second set of flight plans.

37. The method of claim 33 further comprising the steps of:

(a) generating while said aircraft is airborne a digitally encoded signal representative of desired amendment of required flight plan input information that previously was transmitted to said computer based data center;

(b) transmitting said signal representative said desired amendment of required flight plan information to said computer based data center;

(c) generating within said computer based data center an amended flight plan that is based on said signal representative of said desired amendments; and (d) transmitting from said computer based data center to said aircraft a digitally encoded signal representative of said amended flight plan.

38. The method of claim 27 wherein each of said steps other than said step of subsequently establishing a data communication link is performed using a portable computer and said step of subsequently establishing a data communication link is performed by interconnecting said portable computer to a telephone system by means of a modem connected to said portable computer and said telephone system.

39. The method of claim 26 wherein said step (c) of transmitting a proposed flight plan to said source of said signal representative of said required flight plan input information includes the step of transmitting a digitally encoded signal representative of weather that is associated with navigation points that define said proposed flight plan.

40. The method of claim 39 further comprising the steps of:
(a) generating a display of said weather information associated with one or more of said specified navigation points that can be read by an operator that is controlling said method;
(b) reviewing said display prior to transporting said recording media to said aircraft;
(c) transmitting a digitally encoded signal representative of amended flight plan information to said computer based data center;
(d) generating within said computer based data center a second proposed flight plan that is based on said signal representative of said amended flight plan input information;
(e) transmitting from said computer based data center to the source of said signal representative of said amended flight plan input information a second proposed flight plan; and
(f) recording data representative of said second proposed flight plan on said recording medium in place of said data representative of said proposed flight plan.

* * * * *